US009860245B2

(12) United States Patent
Ronda et al.

(10) Patent No.: US 9,860,245 B2
(45) Date of Patent: *Jan. 2, 2018

(54) SYSTEM AND METHODS FOR ONLINE AUTHENTICATION

(71) Applicant: SecureKey Technologies Inc., Toronto (CA)

(72) Inventors: Troy Jacob Ronda, Toronto (CA); Pierre Antoine Roberge, Toronto (CA); Patrick Hans Engel, Richmond Hill (CA); Rene McIver, Toronto (CA); Gregory Howard Wolfond, Toronto (CA); Andre Michael Boysen, Huntsville (CA)

(73) Assignee: Secure Technologies Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,177

(22) Filed: Jun. 29, 2015

(65) Prior Publication Data
US 2015/0304319 A1 Oct. 22, 2015

Related U.S. Application Data

(63) Continuation of application No. 13/213,414, filed on Aug. 19, 2011, now Pat. No. 9,083,533, which is a (Continued)

(51) Int. Cl.
H04L 29/06 (2006.01)
H04L 9/32 (2006.01)

(52) U.S. Cl.
CPC ........ H04L 63/0853 (2013.01); H04L 9/3213 (2013.01); H04L 9/3215 (2013.01);
(Continued)

(58) Field of Classification Search
CPC ......... H04L 9/3228; H04L 9/32; G06F 21/31; G06F 21/33
(Continued)

(56) References Cited

U.S. PATENT DOCUMENTS 6,012,039 A * 1/2000 Hoffman ............... G01F 19/005
382/115
6,249,873 B1 6/2001 Richard et al.
(Continued)

FOREIGN PATENT DOCUMENTS

CN 1956376 5/2007
CN 101252435 8/2008
(Continued)

OTHER PUBLICATIONS

Document relating to U.S. Appl. No. 14/068,586 dated Apr. 15, 2015 (Office Action).
(Continued)

Primary Examiner — Syed Zaidi
(74) Attorney, Agent, or Firm — Bereskin & Parr LLP/S.E.N.C.R.L., s.r.l.

(57) ABSTRACT

A method of authenticating a network client to a relying party computer via a computer server comprises the computer server receiving a transaction code from a token manager via a first communications channel. The network client is configured to communicate with a token manager which is configured to communicate with a hardware token interfaced therewith. The network client is also configured to communicate with the relying party computer and the computer server. The computer server also receives a transaction pointer from the relying party computer via a second communications channel that is distinct from the first communications channel. Preferably, the transaction pointer is unpredictable by the computer server. The computer server
(Continued)

transmits an authorization signal to the relying party computer in accordance with a correlation between the transaction code and the transaction pointer. The authorization signal facilitates authentication of the network client to the relying party computer.

16 Claims, 13 Drawing Sheets

Related U.S. Application Data continuation of application No. 13/202,387, filed as application No. PCT/CA2010/000227 on Feb. 19, 2010, now Pat. No. 8,756,674.

(60) Provisional application No. 61/153,950, filed on Feb. 19, 2009, provisional application No. 61/160,914, filed on Mar. 17, 2009, provisional application No. 61/168,004, filed on Apr. 9, 2009, provisional application No. 61/184,162, filed on Jun. 4, 2009, provisional application No. 61/186,185, filed on Jun. 11, 2009.

(52) U.S. Cl.
CPC .......... H04L 9/3228 (2013.01); H04L 9/3268 (2013.01); H04L 63/08 (2013.01); H04L 2209/56 (2013.01); H04L 2463/102 (2013.01)

(58) Field of Classification Search
USPC .......................................................... 726/9
See application file for complete search history.

(56) References Cited

U.S. PATENT DOCUMENTS

| | | | |
|---|---|---|---|
| 7,254,561 B1 | 8/2007 | Sjoblom | |
| 7,353,383 B2 | 4/2008 | Skingle | |
| 7,861,077 B1 | 12/2010 | Gallagher, III | |
| 8,578,467 B2 | 11/2013 | Ronda et al. | |
| 8,756,674 B2 | 6/2014 | Ronda et al. | |
| 8,943,311 B2 | 1/2015 | Ronda et al. | |
| 2001/0031312 A1 | 10/2001 | Freeburn | |
| 2001/0037312 A1 | 11/2001 | Gray | |
| 2002/0038296 A1 | 3/2002 | Margolus et al. | |
| 2002/0078150 A1 | 6/2002 | Thompson et al. | |
| 2002/0091646 A1* | 7/2002 | Lake | G06Q 20/04 705/67 |
| 2002/0095570 A1 | 7/2002 | Eldridge et al. | |
| 2002/0128977 A1 | 9/2002 | Nambiar et al. | |
| 2002/0161723 A1 | 10/2002 | Asokan et al. | |
| 2002/0169988 A1 | 11/2002 | Vandergeest et al. | |
| 2002/0198848 A1 | 12/2002 | Michener | |
| 2003/0084302 A1 | 5/2003 | de Jong et al. | |
| 2003/0220879 A1 | 11/2003 | Burger et al. | |
| 2003/0226017 A1 | 12/2003 | Palekar et al. | |
| 2004/0054625 A1 | 3/2004 | Kellogg et al. | |
| 2004/0064687 A1 | 4/2004 | Pfitzmann et al. | |
| 2004/0107146 A1 | 6/2004 | Alfano | |
| 2004/0260699 A1 | 12/2004 | Aoki et al. | |
| 2005/0010758 A1 | 1/2005 | Landrock et al. | |
| 2005/0273442 A1 | 12/2005 | Bennett et al. | |
| 2006/0053296 A1 | 3/2006 | Busboom et al. | |
| 2006/0206709 A1 | 9/2006 | Labrou et al. | |
| 2006/0241975 A1 | 10/2006 | Brown | |
| 2006/0272023 A1 | 11/2006 | Schmeidler et al. | |
| 2007/0022473 A1 | 1/2007 | Hird | |
| 2007/0125840 A1* | 6/2007 | Law | G06Q 20/10 235/379 |
| 2007/0130463 A1* | 6/2007 | Law | G06F 21/34 713/168 |
| 2007/0169182 A1* | 7/2007 | Wolfond | G06F 21/31 726/7 |
| 2007/0174904 A1 | 7/2007 | Park | |
| 2008/0086771 A1 | 4/2008 | Li et al. | |
| 2008/0212771 A1* | 9/2008 | Hauser | G06F 21/305 380/44 |
| 2008/0256616 A1 | 10/2008 | Guarraci et al. | |
| 2008/0301461 A1 | 12/2008 | Coulier et al. | |
| 2009/0028082 A1 | 1/2009 | Wynn et al. | |
| 2009/0138948 A1 | 5/2009 | Calamera et al. | |
| 2009/0239503 A1 | 9/2009 | Smeets | |
| 2010/0031029 A1 | 2/2010 | Ilyadis | |
| 2010/0088752 A1 | 4/2010 | Nagulakonda et al. | |
| 2010/0185864 A1 | 7/2010 | Gredes et al. | |
| 2010/0191977 A1* | 7/2010 | Landrock | G06F 21/645 713/176 |
| 2011/0265159 A1 | 10/2011 | Ronda et al. | |
| 2011/0302646 A1 | 12/2011 | Ronda et al. | |
| 2011/0307949 A1 | 12/2011 | Ronda et al. | |
| 2012/0072718 A1 | 3/2012 | Ronda et al. | |
| 2014/0059348 A1 | 2/2014 | Ronda et al. | |

FOREIGN PATENT DOCUMENTS

| | | |
|---|---|---|
| EP | 2401838 | 1/2010 |
| EP | 2369811 | 9/2011 |
| EP | 2485453 | 8/2012 |
| WO | 02/48846 | 6/2002 |
| WO | 03/015370 | 2/2003 |
| WO | 2006/021865 | 3/2006 |
| WO | 2006/065002 | 6/2006 |
| WO | 2009/001197 | 12/2008 |
| WO | 2010/004576 | 1/2010 |
| WO | 2010/063091 | 5/2010 |
| WO | 2010094125 | 8/2010 |

OTHER PUBLICATIONS

Document relating to EP Application No. 1116854.3 dated Jan. 11, 2013 (Amendment).
Document relating to EP Application No. 11168548.3, dated Jul. 10, 2012 (EP Communication).
Document relating to EP Application No. 11168548.3, dated Mar. 28, 2012 (Amendment).
Document relating to EP Application No. 11168548.3, dated Aug. 29, 2011 (European Search Report).
Document relating to EP Application No. 09829904.3, dated Oct. 26, 2012 (Result of Telephone Consultation).
Document relating to EP Application No. 09829904.3, dated Oct. 23, 2012 (Amendment).
Document relating to EP Application No. 09829904.3, dated Apr. 3, 2012 (Supplementary European Search Report).
Document relating to EP Application No. 10743370.8, dated Nov. 14, 2013 (Decision to Grant).
Document relating to EP Application No. 10743370.8, dated Jun. 27, 2013 (Intention to Grant).
Document relating to EP Application No. 10743370.8, dated Jan. 24, 2013 (Amendment).
Document relating to EP Application No. 10743370.8, dated Jul. 6, 2012 (Supplementary European Search Report).
Document relating to EP Application No. 10743370.8, dated Apr. 12, 2012 (Amendment).
Document relating to EP Application No. 10743370.8, dated Nov. 21, 2011 (EP Communication).
Document relating to EP Application No. 11181706.0, dated Feb. 8, 2013 (Amendment).
Document relating to EP Application No. 11181706.0, dated Jul. 6, 2012 (European Search Report).
Documents related to U.S. Appl. No. 13/101,059 (Prosecution Documents).
Documents related to U.S. Appl. No. 13/127,672 (Prosecution Documents).
Documents related to U.S. Appl. No. 13/202,387 (Prosecution Documents).
Document relating to U.S. Appl. No. 14/068,586, dated Sep. 30, 2014 (Office Action).

(56) References Cited

OTHER PUBLICATIONS

Document relating to U.S. Appl. No. 14/068,586, dated Dec. 23, 2014 (Office Action Response).
Document relating to AU Application No. 2009322102, dated Jan. 14, 2014 (Office Action).
Document relating to AU Application No. 2010215040, dated Jan. 15, 2014 (Office Action).
Document relating to International Application Application No. PCT/CA2009/001594, dated Jun. 21, 2010 (Written Opinion).
Document relating to International Application Application No. PCT/CA2009/001594, dated Jul. 13, 2010 (ISR).
Document relating to International Application Application No. PCT/CA2009/001594, dated Apr. 12, 2011 (IPRP).
Document relating to International Application Application No. PCT/CA2010/000227, dated May 26, 2010 (Written Opinion).
Document relating to International Application Application No. PCT/CA2010/000227, dated Jun. 2, 2011 (IPRP).
Wikipedia: IPSec, URL: http://en.wikipedia.org/w/index.php?title=Ipsec&oldid=249060619, Jun. 26, 2012, 6 pgs.
Pujolle et al., "Secure Session Management with Cookies", Dec. 2009, International Conference on Information, Communications and Signal Processing, ICICS 2009, pp. 1-6.
Document relating to U.S. Appl. No. 13/202,387, dated Mar. 31, 2014 (Notice of Allowance).
Document relating to U.S. Appl. No. 13/127,672, dated Mar. 31, 2014 (Response and Request for Continued Examination).
Document relating to U.S. Appl. No. 13/127,672, dated Jun. 2, 2014 (Notice of Allowance).
Document relating to U.S. Appl. No. 13/127,672, dated Sep. 11, 2014 (Notice of Allowance).
Document relating to U.S. Appl. No. 13/127,672, dated Jul. 31, 2013 (Office Action Response).
Document relating to U.S. Appl. No. 13/127,672, dated Oct. 31, 2013 (Final Office Action).
Document relating to U.S. Appl. No. 13/202,387, dated Aug. 30, 2013 (Office Action).
Document relating to U.S. Appl. No. 13/202,387, dated Dec. 27, 2013 (Response to Office Action).
Document relating to U.S. Appl. No. 13/213,414, dated Dec. 7, 2012 (Office Action).
Document relating to U.S. Appl. No. 13/213,414, dated Apr. 8, 2013 (Response to Office Action).
Document relating to U.S. Appl. No. 13/213,414, dated Jul. 18, 2013 (Office Action).
Document relating to U.S. Appl. No. 13/213,414, dated Nov. 8, 2013 (Response to Office Action & RCE).
Document relating to U.S. Appl. No. 13/213,414, dated Oct. 17, 2014 (Office Action).
Document relating to U.S. Appl. No. 13/213,414, dated Jan. 15, 2015 (Office Action Response).
Document relating to EP Application No. 09829904.3, dated Jul. 21, 2015 (Examination).
Document relating to U.S. Appl. No. 14/068,586, dated Aug. 4, 2015 (Notice of Allowance).
Document relating to EP Application No. 1116854.3 dated Sep. 15, 2015 (Intention to Grant).

* cited by examiner

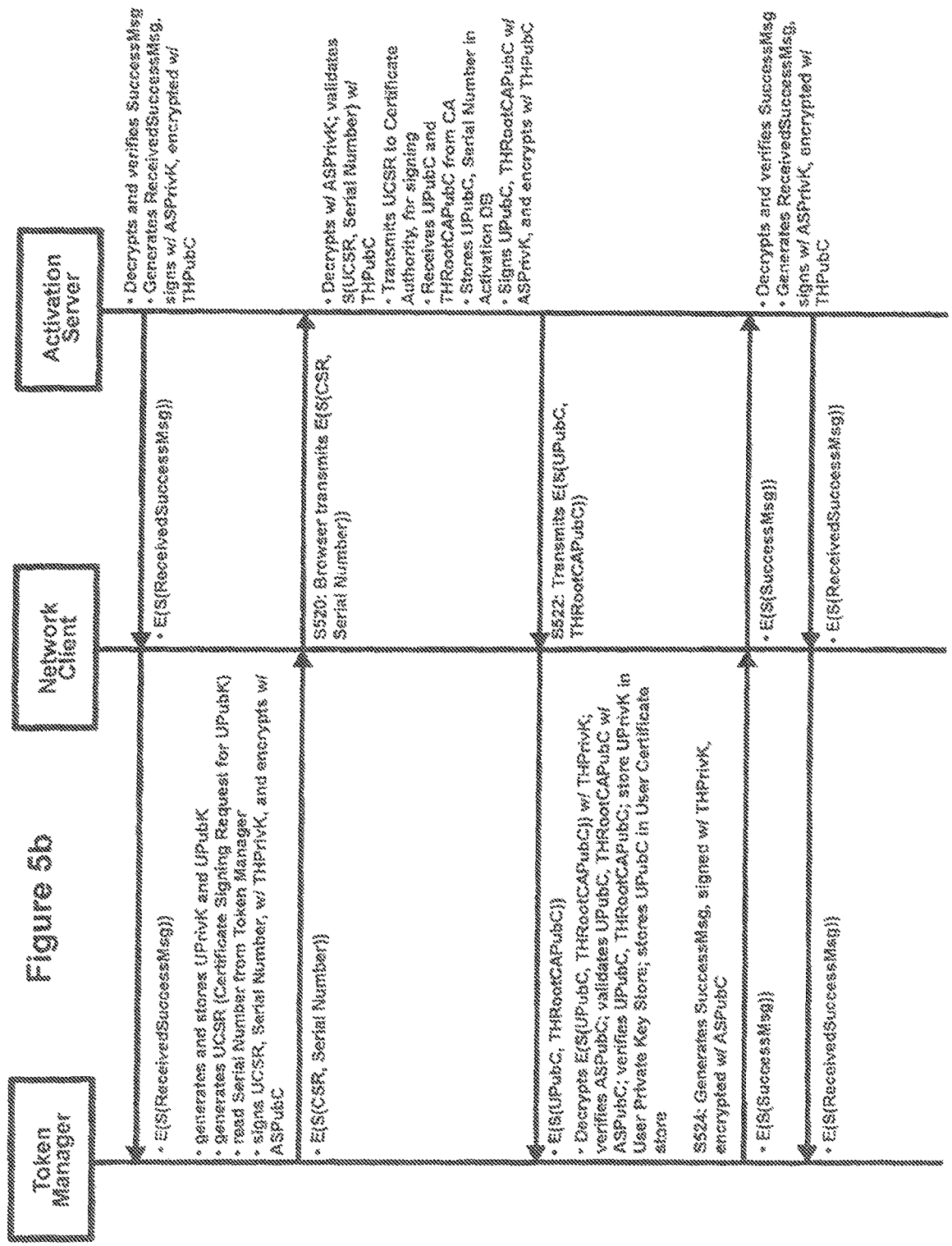

SYSTEM AND METHODS FOR ONLINE AUTHENTICATION

CROSS-REFERENCE TO RELATED APPLICATIONS

This patent application is a continuation of U.S. patent application Ser. No. 13/213,414, filed Aug. 19, 2011, entitled "System and Methods for Online Authentication", which is a continuation of U.S. patent application Ser. No. 13/202,387, filed Aug. 19, 2011, now patented as U.S. Pat. No. 8,756,674, entitled "System and Methods for Online Authentication", which is a 35 USC 371 national phase entry of PCT/CA2010/00227, filed Feb. 19, 2010, which, in turn, claims the benefit of U.S. Provisional Patent Application No. 61/153,950, filed Feb. 19, 2009, entitled "System and Methods for Certificate-Based Legacy E-Commerce", and the benefit of U.S. Provisional Patent Application No. 61/160,914, filed Mar. 17, 2009, entitled "Card Presence-Based Internet Legacy E-Commerce", and the benefit of U.S. Provisional Patent Application No. 61/168,004, filed Apr. 9, 2009, entitled "Card Presence-Based Internet Legacy ECommerce" and the benefit of U.S. Provisional Patent Application No. 61/184,162, filed Jun. 4, 2009, entitled "System and Methods for Conducting an E-Commerce Transaction Initiated by a Single User Interaction", and the benefit of U.S. Provisional Patent Application No. 61/186,185, filed Jun. 11, 2009, entitled "System and Methods for Conducting an E-Commerce Transaction Initiated by a Single User Interaction", the entire contents of each of which are hereby expressly incorporated herein by reference.

FIELD

This patent application relates to systems and methods for network client authentication. In particular, this patent application describes systems and methods for authenticating a network client to a server using a hardware token.

BACKGROUND

The vast majority of computer servers required a username and shared secret for authentication of network clients. Two types of shared secrets are currently used for authentication: static secrets and dynamic secrets.

Static secrets, such as simple passwords, are typically easy to guess and, therefore, are susceptible to fraudulent usage. Complex passwords, although more difficult to guess, tend to get written down and, therefore, are also susceptible to fraudulent usage.

Dynamic secrets, such as One-Time Passwords (OTPs) are becoming increasingly popular. Whereas static secrets are used for each authentication attempt until expiry, dynamic secrets change with each authentication attempt. Dynamic secrets are typically generated by a portable hardware device or authenticator that must remain synchronized with the server that accepts the secret. Although dynamic secrets provide greater protection from fraudulent activity than static secrets, the security of the authentication scheme can be compromised if the portable authenticator is lost or stolen.

Other authentication schemes use a public/private asymmetric key infrastructure for authentication. The hardware cryptographic token that stores the public/private encryption keys is usually protected by a password that is input to the user's computer user. This password can be easily stolen by rogue software running on the user's computer, thereby reducing the security of the private encryption key(s).

SUMMARY

By way of overview, in a first aspect this disclosure relates to a method of authenticating a network client to a relying party computer via a computer server. In this aspect, the network client is configured to communicate with the relying party computer and the computer server. The network client is also configured to communicate with a token manager that itself is configured to communicate with a hardware token interfaced with the token manager.

The method, according to this first aspect, involves the computer server receiving a transaction code from the token manager via a first communications channel, and receiving a transaction pointer from the relying party computer via a second communications channel that is distinct from the first communications channel. Preferably, the transaction pointer is unpredictable by the computer server. The computer server transmits an authorization signal to the relying party computer in accordance with a correlation between the transaction code and the transaction pointer. The authorization signal facilitates authentication of the network client to the relying party computer.

In a second aspect, this disclosure also relates to a method of authenticating a network client via a computer server. In this aspect, the network client is configured to communicate with the relying party computer and the computer server, and is also configured to communicate with a token manager which, in turn, is configured to communicate with a hardware token interfaced with the token manager.

The method, according to this second aspect, involves the token manager transmitting a transaction code to the computer server via a first communications channel, and the network client transmitting a transaction pointer to the relying party computer via a second communications channel that is distinct from the first communications channel. Preferably, the transaction pointer is unpredictable by the computer server. The network client receives an authorization message from the relying party computer in accordance with a correlation between the transaction code and the transaction pointer.

In one implementation, the computer server validates the transaction code, and the step of transmitting an authorization signal involves the computer server transmitting the authorization signal in accordance with an outcome of the transaction code validating.

The transaction code validating may comprise the computer server verifying that the transaction code was generated by the hardware token.

In one implementation, the computer server transmits the transaction pointer to the token manager via the first communications channel prior to receiving the transaction pointer from the relying party computer.

Preferably, the transaction code is unpredictable by the computer server. Further, preferably, the computer server receives the transaction code prior to receiving the transaction pointer.

In a third aspect, this disclosure also relates to a method of authenticating a network client to a relying party computer via a computer server. The network client is configured to communicate with the relying party computer and the computer server, and is also configured to communicate with a token manager which is configured to communicate with a hardware token interfaced with the token manager The method, according to this third aspect, involves the computer server receiving a credential from the token manager or the network client via a first communications channel, and receiving a transaction request from the relying party computer via a second communications channel that is distinct from the first communications channel. The computer server transmits an authorization signal to the relying party computer in response to the transaction request in accordance with a determination of validity of the credential and data originating from the hardware token. The authorization signal facilitates authentication of the network client to the relying party computer.

Preferably, the computer server receives the transaction request prior to receiving the credential. The computer server may determine the validity by comparing the data originating from the hardware token with expected data. Further, the computer server may determine the validity by verifying that the credential is associated with the token manager.

BRIEF DESCRIPTION OF THE DRAWINGS

The foregoing aspects will now be described, by way of example, with reference to the accompanying drawings, in which:

FIGS. 5a and 5b together comprise a message flow diagram that depicts the transmission of messages during an optional Activation process implemented by the Token Manager;

DETAILED DESCRIPTION

Communications System

Figure 1:
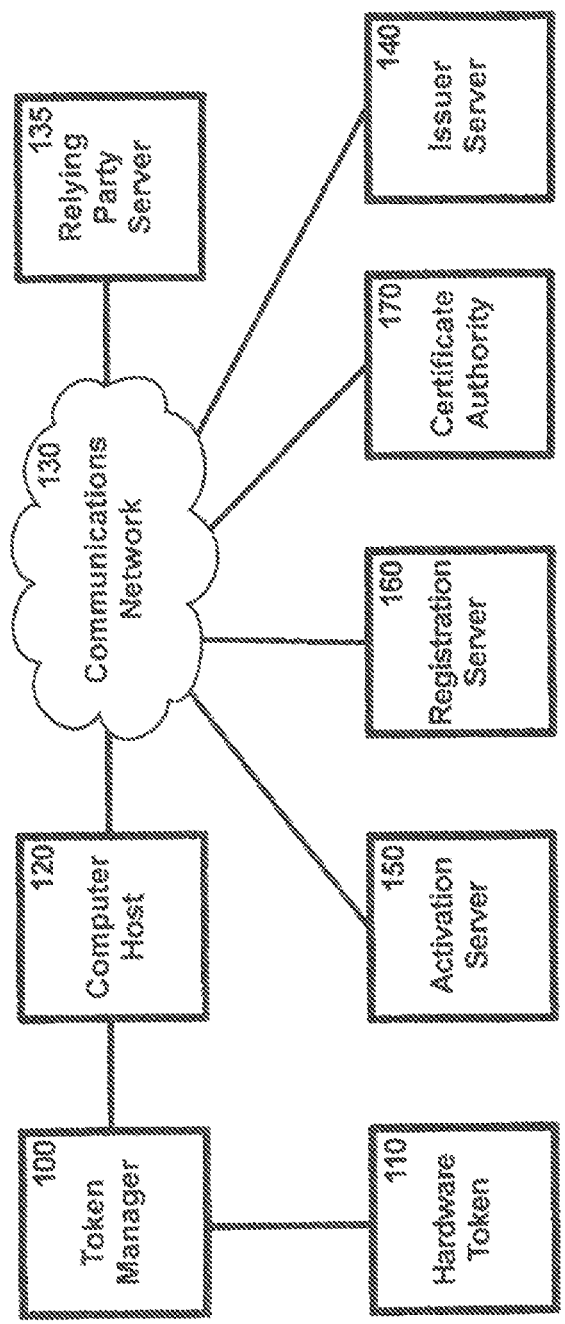
FIG. 1 is a block diagram illustrating the interconnection of the Token Manager, the Computer Host, the Activation Server, the Registration Server, the Relying Party Server, and the Issuer Server.

Turning to FIG. 1, there is shown a Computer Host 120, one or more Relying Party Servers 135, one or more Issuer Servers 140, one or more Activation Servers 150, one or more Registration Servers 160, and a Certificate Authority 170. Although the Computer Host 120, Relying Party Server 135, Issuer Server 140, Activation Server 150, Registration Server 160, and Certificate Authority 170 are shown being interconnected by a single communications network 130, the communications network 130 may comprise one or more different networks. Further, although the Token Manager 100 is shown being in direct communication with the Computer Host 120, it should be understood that the Token Manager 100 and the Computer Host 120 need not be implemented as separate computing devices; rather, the functionality of the Token Manager 100 may be embedded within the Computer Host 120 such that the Token Manager 100 and the Computer Host 120 comprise a single computing device.

The hardware token 110 is used herein as a form of portable authenticator, and may be implemented as a contactless form factor, a contact form factor (e.g. magnetic stripe), or other NFC and/or ISO 14443 based form factors. Suitable implementations of the hardware token 110 include a smartcard, a payment card, a credit card, a loyalty card, a building access pass, a driver's license, a health card, and a passport. Typically, the hardware token 110 has a hardware token number (e.g. payment card number, credit card number, loyalty card number, building access pass number, driver's license number, health card number, or passport number) provided thereon.

The Token Manager 100 may communicate with the hardware tokens 110 over a contactless protocol, such as ISO 14443. Alternately, the Token Manager 100 may communicate with the hardware tokens 110 without a wireless link. Although the hardware token 110 is shown being in direct communication with the Token Manager 100, the hardware token 110 and the Token Manager 100 need not be implemented as separate devices; rather, the functionality of the hardware token 110 may be embedded within the Token Manager 100 such that the hardware token 110 and the Token Manager 100 comprise a single device.

Figure 2:
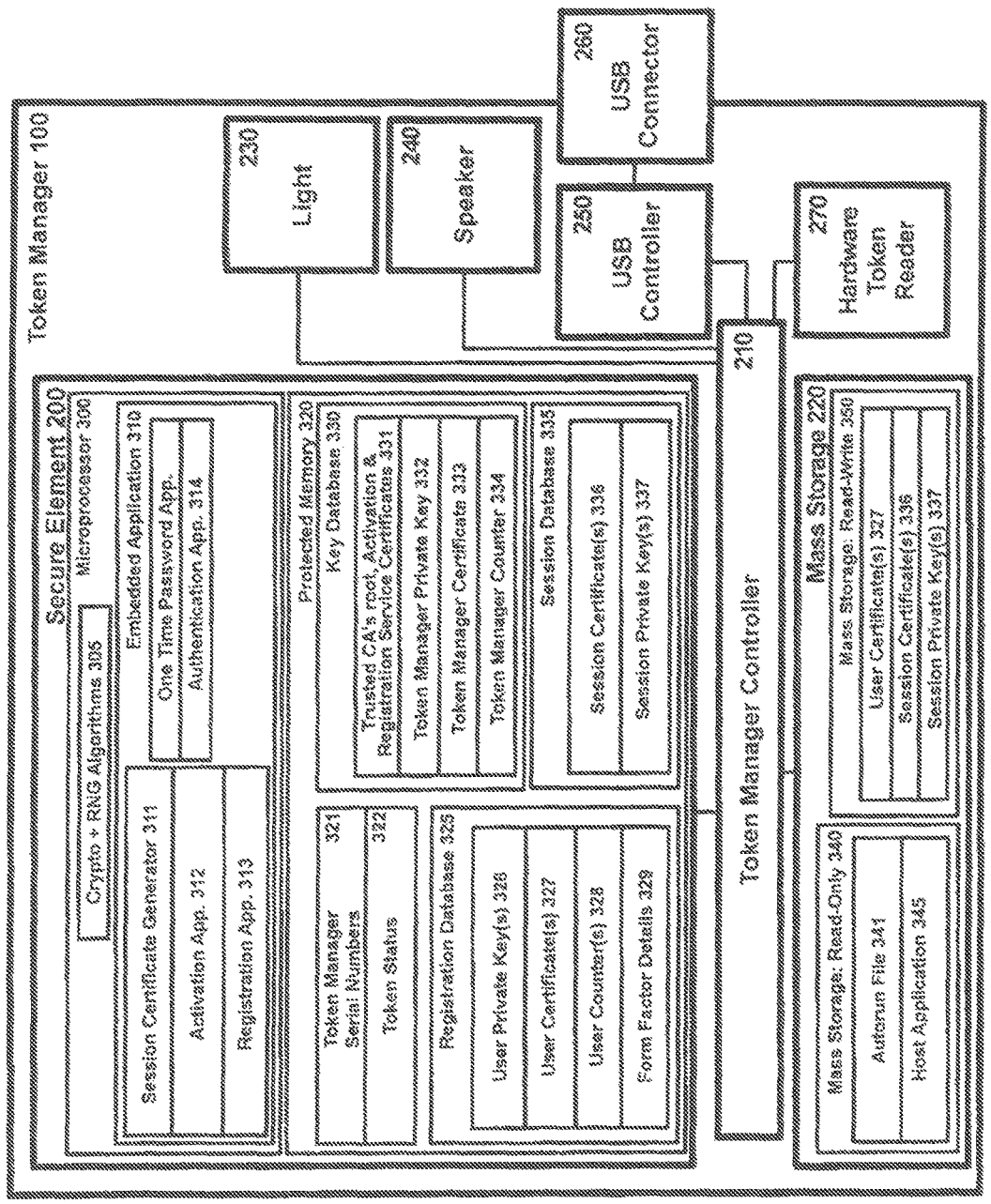
FIG. 2 is a detailed schematic view of the Token Manager.

As shown in FIG. 2, the Token Manager 100 may comprise a Secure Element 200, a Token Manager Controller 210, and a mass memory storage 220. The Token Manager 100 may be implemented as a portable USB device, in which case the Token Manager 100 may also include a multi-colour light emitting device (Light) 230, a sound emitting device (Speaker) 240, a USB controller 250, and a USB connector 260. The Token Manager 100 may have an embedded contactless or contact (e.g. magnetic stripe) token reader/writer interface 270 that allows the Token Manager 100 to communicate with a hardware token 110.

The Token Manager 100 may connect to a Computer Host 120 using the USB Connector 260. The USB connector 260 and USB controller 250 provide USB connectivity between the Token Manager 100 and tire Computer Host 120. Alternately, the Token Manager 100 may be implemented as a self-contained contactless form factor having a wireless (e.g. Bluetooth) contactless interface (not shown) that allows the Token Manager 100 to communicate with a wireless contactless reader that is connected to, or configured within, the Computer Host 120. The multi-colour light emitting device (Light) 230 is used to visually notify the user of the internal status of the Token Manager 100 when connected to a Computer Host 120.

Preferably, the Secure Element 200 is implemented using smart card technology with a built-in micro-processor (sometimes called a micro-controller or crypto-processor) and protected memory for secure storage. The Secure Element 200 provides a protected self-contained computing environment used for running cryptographic algorithms as well as proprietary applications stored within the Token Manager 100. It also allows for storing data that is either never released to the operating system of the user's Computer Host 120 or only released when specific access conditions, managed by the Secure Element's 200 micro-processor, are met.

As shown, the Secure Element 200 is divided into a microprocessor area 300 and a protected memory area 320. The microprocessor 300 provides processing capabilities such as cryptographic algorithms and random number generator algorithms 305 and may be used to ran proprietary embedded applications 310, such as a Session Certificate Generator 311, an Activation procedure application 312, a Registration procedure application 313, and an Authentication procedure application 314.

Preferably, the Session Certificate Generator 311, Activation procedure application 312, Registration procedure application 313, and Authentication procedure application 314 are implemented as a set of computer processing instructions that are executed by the microprocessor area 300. However, the functionality of the Session Certificate Generator 311, Activation procedure application 312, Registration procedure application 313, and Authentication procedure application 314 may instead be implemented in electronics hardware. For example, any of the Session Certificate Generator 311, Activation procedure application 312, Registration procedure application 313, and Authentication procedure application 314 may be implemented as a Field Programmable Gate Array (FPGA) or a Complex Program Logic Device (CPLD).

The protected memory 320 is used to store sensitive information required for implementation of the methods described herein, such as a Token Manager Serial Numbers 321, Token Status 322. The protected memory 320 also includes a Registration Database 325, a Key Database 330, and a Session Database 335. The Registration database 325 includes zero or more User Private Keys 326. User Certificates 327, and Form Factor details 329. The Key Database 330 includes the root certificate from a Trusted Certificate Authority, as well as an Activation service certificate and a Registration service certificate 331. The Key Database 330 also includes a Token Manager Private Key 332 and a Token Manager Certificate 333. The Session Database 335 includes zero or more Session certificates 336 and Session Private Keys 337.

The Mass-storage area 220 includes a read-only partition 340 and optionally a read-write partition 350. Preferably, the read-only partition 340 is exposed to the Computer Host 120 when the Token Manager 100 is connected to the Computer Host 120 and may include an Autorun file 341 and a Network Client 345. The Autorun file 341 contains the minimum instructions to the Computer Host 120 for running the Network Client 345 on the Computer Host 120. The optional Read-Write partition 350 can be used to expose the Computer Host 120 to one or more User Certificate(s) 327, Session Certificate 336 and Session Private Key 337.

The function of the foregoing artefacts will become apparent from the following discussion.

Figure 3:
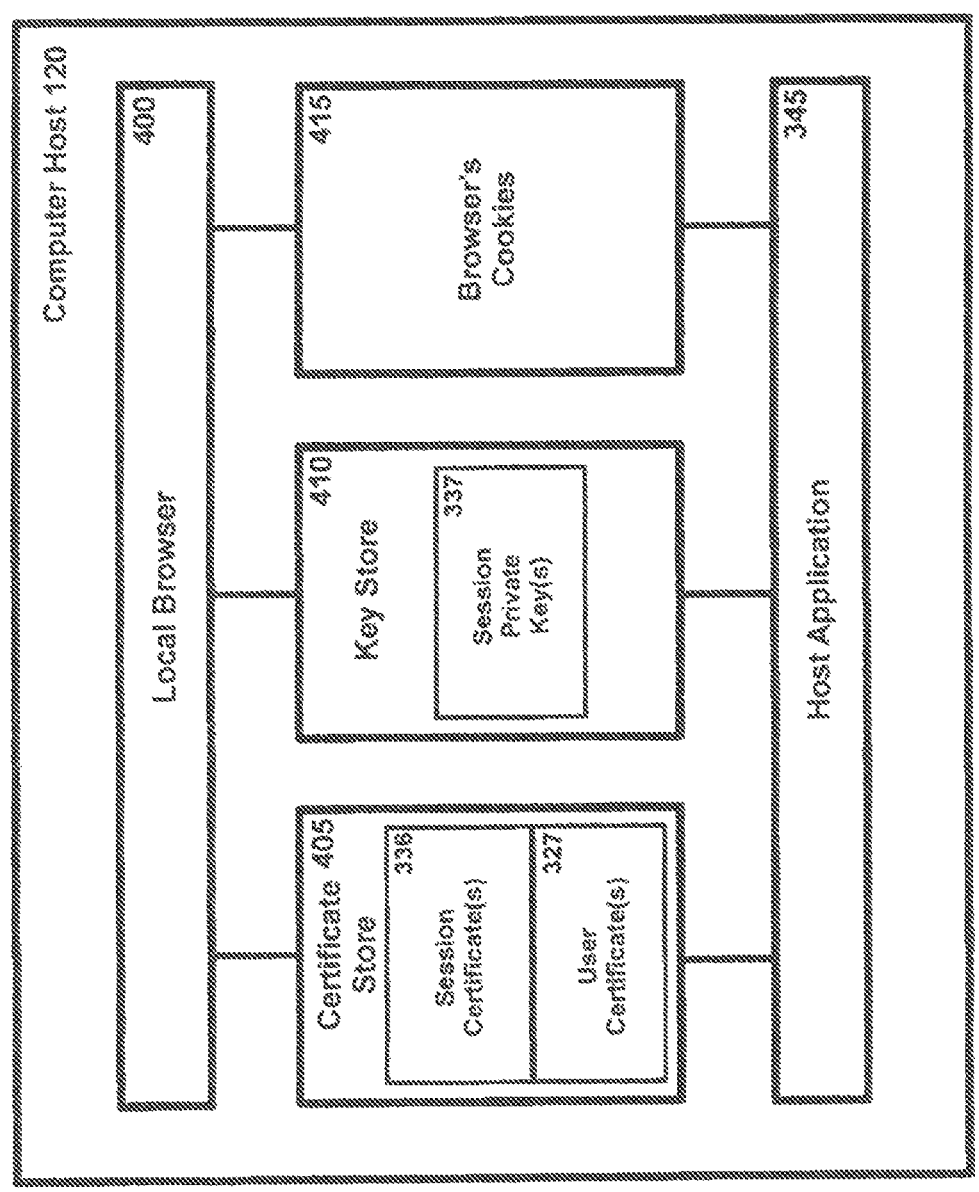
FIG. 3 is a schematic view of the Computer Host.

The Computer Host 120 comprises a networked computing device, and may be implemented as a personal computer, a data messaging device, a two-way pager, a wireless e-mail device, a wireless telephone, a wireless internet appliance, as examples. As shown in FIG. 3, the Computer Host 120 comprises, the Network Client 345, a local browser 400, a Certificate Store 405, a Key Store 410, and a browser cookie store 415. The Network Client 345 has interfaces with the Certificate Store 405, the Key Store 410 and the browser cookie store 415. Depending on the Computer Host configuration, the Session Certificate(s) 336 and User Certificate(s) 327 might be stored in the computer host Certificate Store 405. Similarly, the Session Private Key(s) 337 might be stored in the Key Store 410. The browser 400 interfaces with the Certificate Store 405, the Key Store 410 and browser cookie store 415, and is used to facilitate communication with the Relying Party Server 135, the Issuer Server 140, the Activation Server 150, and the Registration Server 160 over the communications network 130.

Figure 4A:
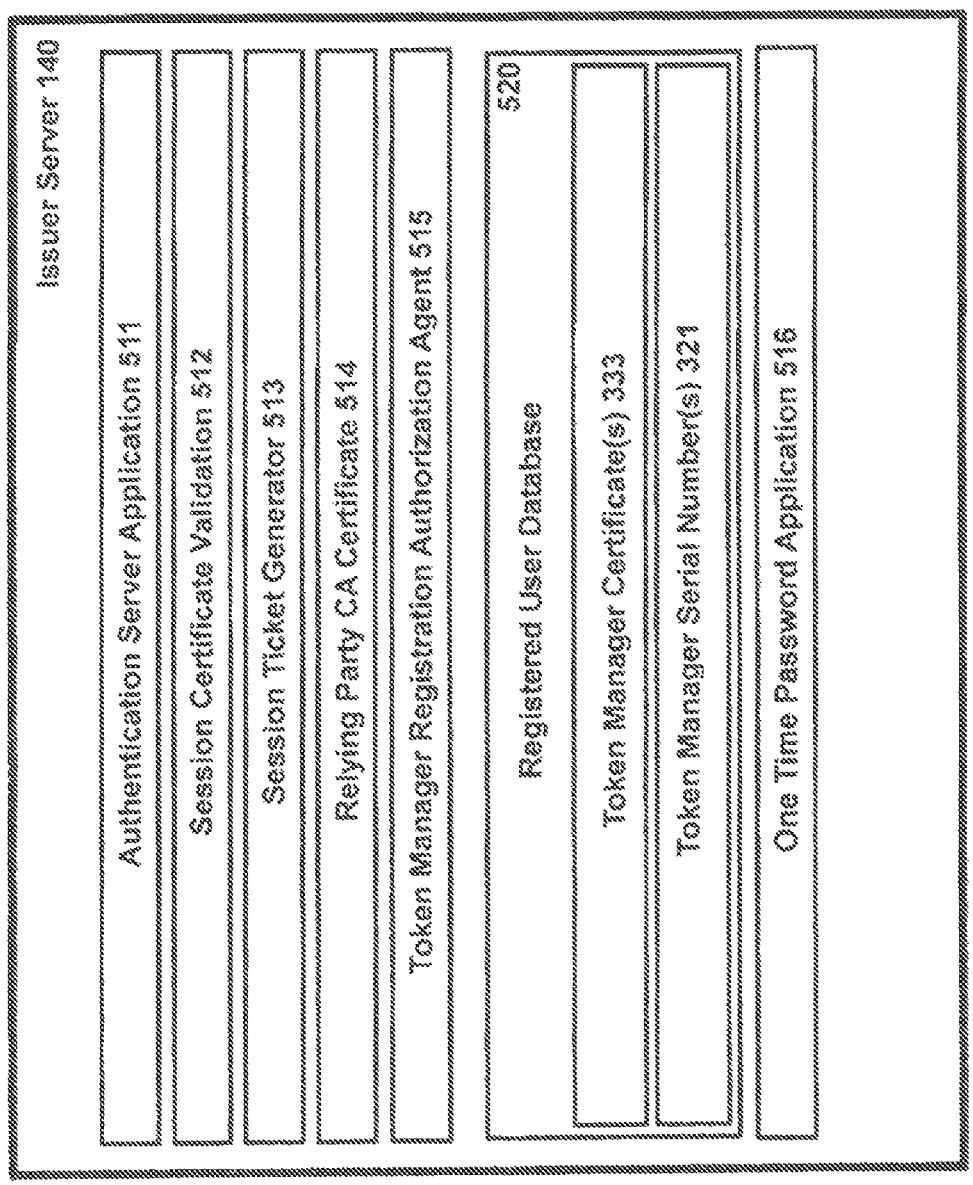
FIG. 4a is a schematic view of the Issuer Server.
Figure 4B:
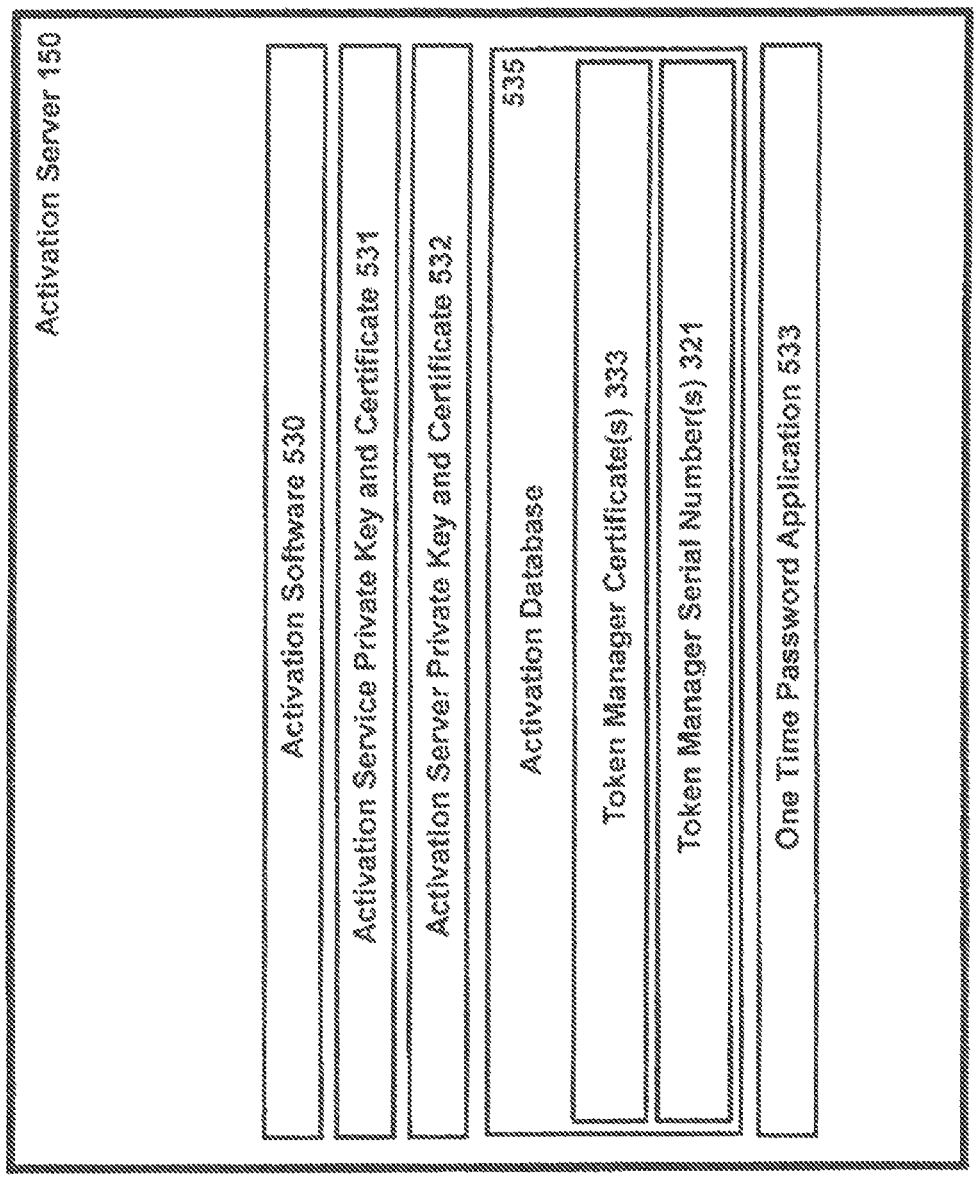
FIG. 4b is a schematic view of the Activation Server.

Preferably, the Relying Party Server 135, Activation Server 150, and Registration Server 160 are implemented as computer web servers, and communicate with the Certificate Authority 170 via a secure protocol over the communications network 130. As shown in FIG. 4b, the Activation Server 150 includes Activation Software 530, as Activation Service Private Key and Certificate 531, an Activation Server Private Key and Certificate 532, an optional One Time Password application 533, and an Activation Database 535. The Activation Database 535 includes zero or more records of Token Manager Certificates 533 and Token Manager Serial Numbers 321. The Activation Server 150 uses the Activation Software 530 to implement the Token Manager Activation process (described below).

Figure 4C:
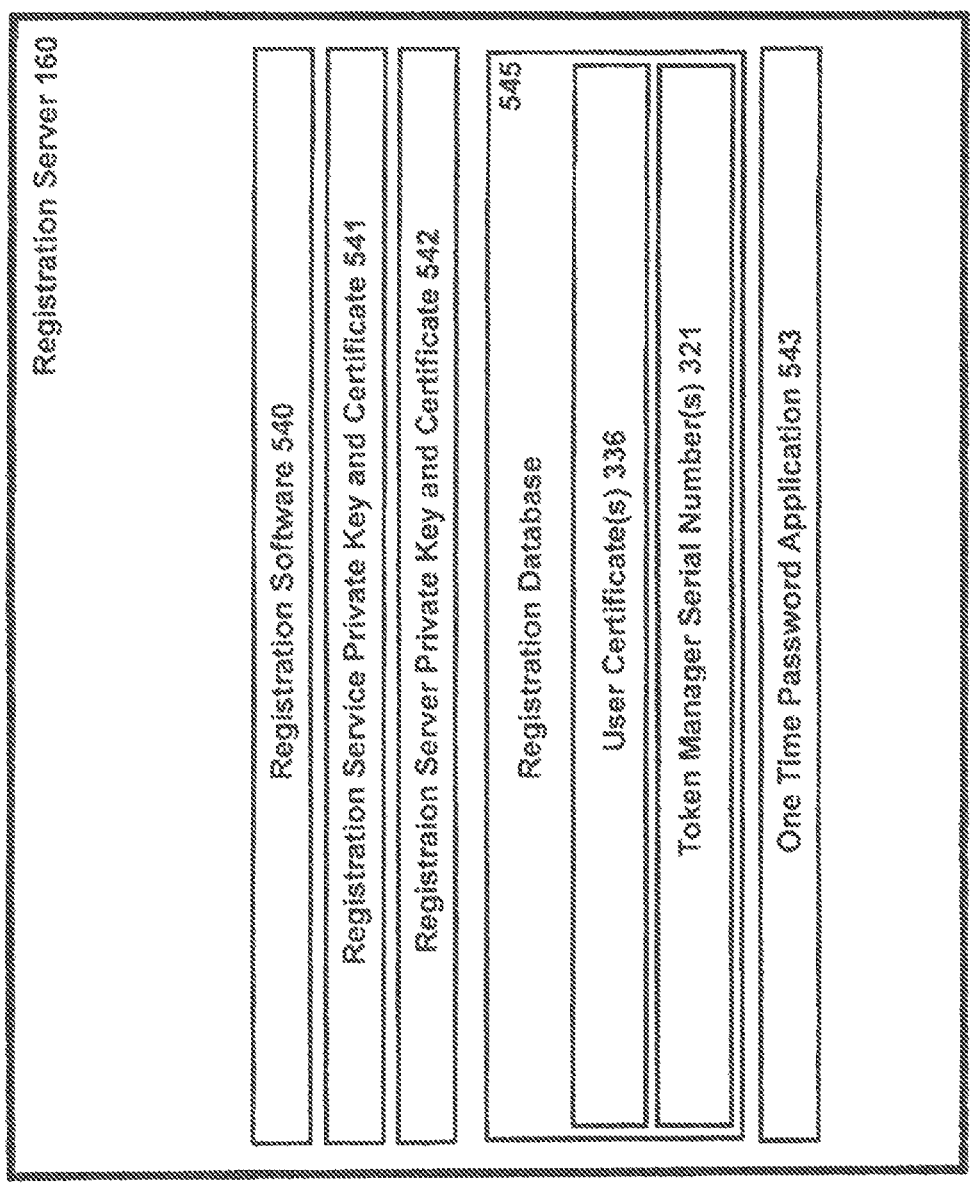
FIG. 4c is a schematic view of the Registration Server.

As shown in FIG. 4c, the Registration Server 160 includes Registration Software 540, a Registration Service Private Key and Certificate 541, a Registration Server Private Key and Certificate 542, an optional One Time Password application 543, and a Registration Database 545. The Registration Database 545 includes zero or more records of User Certificates 336 and Token Manager Serial Numbers 321. The Registration Server 160 uses the Registration Software 540 to implement the Token Manager Registration process (described below).

Once a Token Manager 100 has been activated (via the Activation Server 150), and registered with an Issuer Server 140 (via the Registration Server 160), an Authentication process (discussed below) may be invoked to authenticate the Token Manager 100 with the Relying Party Server 170 via the Issuer Server 140 with which the Token Manager 100 was registered. The authentication process, if successful, provides the user with access to the Relying Party's online applications. As shown in FIG. 4a, the Issuer Server 140 includes an Authentication Server Application 511, a Session Certificate Validation application 512, a Session Ticket Generator 513, a Relying Party CA Certificate 514, a token Manager Registration Authorization Agent 515, an optional One Time Password application 516, and a Registered User Database 520. The Registered User Database 520 includes zero or more Token Manager Certificates 333 and Token Manager Serial Numbers 321. The Issuer Server 140 uses the Authentication Server Application 511 to implement the Token Manager Authentication process (described below).

Preferably, the Token Manager Activation process and the Token Manager Registration process requires the generation of signed certificates from one or more Certificate Authorities 170. Preferably, the Certificate Authority 170 includes a Root Certificate Authority, a Token Manager Certificate Authority, and a Relying party (RP) Certificate Authority. The Token Manager Certificate Authority and the RP Certificate Authority may be completely separate Certificate Authorities with self signed root certificates, or they may be subordinate Certificate Authorities to the Root Certificate Authority.

Functional details of the Token Manager 100, the Issuer Server 140, the Activation Server 150, and the Registration Server 160 will be discussed with reference to FIGS. 5 to 9.

Token Manager 100

The Token Manager 100 interfaces with the Network Client 345 of the Computer Host 120. The Network Client 343 is configured to communicate with a computer server (e.g. Issuer Server 140) over the communications network 130 and to communicate with the Token Manager 100. The Token Manager 100 is configured to implement an Authentication process, and may also be configured to implement an Activation process and a Registration Process.

The Activation process causes the Token Manager 100 to be provided with a single User private key UPrivK and a single Certificate Authority-signed User public certificate (a parent digital certificate) UPubC that includes a User public key UPubK corresponding to the User private key UPrivK. The Registration process causes the Token Manager 100 to use the User public certificate UPubC and a hardware token 110 to register the Token Manager 100 for use with each Issuer Server 140. The User public certificate UPubC may be common to each Issuer Server 140. The Registration process also establishes an association between the User Public Certificate UPubC and the hardware token 110 (provided or trusted by the Issuer associated with the Issuer Server 140). The Registration process may also establish an association between the User Public Certificate UPubC, the hardware token 110 and the Token Manager 100.

The Authentication process causes the Token Manager 100 to authenticate the user with the Issuer Server 140 by providing the Issuer Server 140 with a credential that is uniquely associated with the Token Manager 100 or the hardware token 110. The credential may include data originating from the Issuer Server 140, thereby verifying that the hardware token 110 expected by the Issuer Server 140 was physically presented to the Token Manager 100 during the Authentication process. The Token Manager 100 may use the User digital certificate UPubC or a digital public certificate of the hardware token 110 to authenticate the user.

Token Manager Activation

Figure 5A:
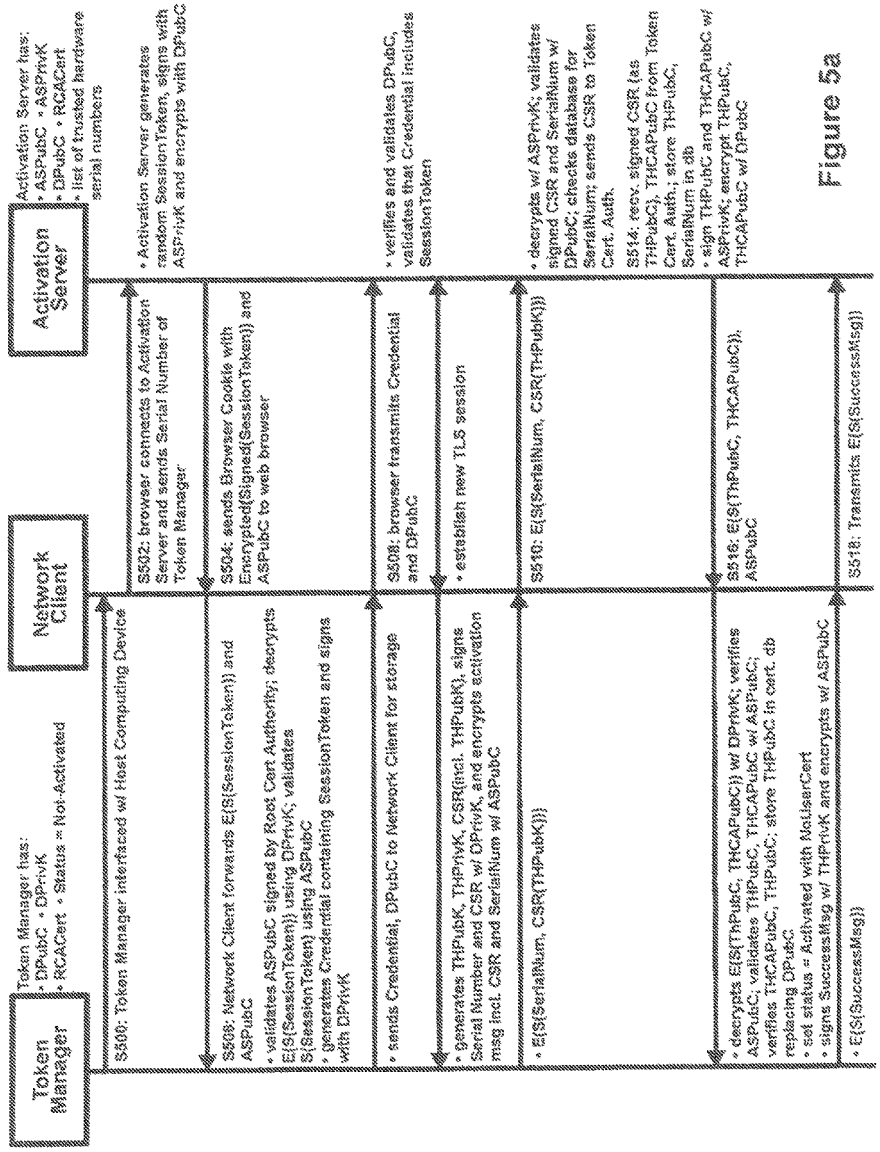

The Activation process that may be implemented by the Token Manager 100 will now be described with reference to FIGS. 5a and 5b. The Token Manager 100 may include a Distribution Public Certificate DPubC, and a corresponding Distribution private encryption key DPrivK, both of which were installed on the Token Manager 100 at the time the Token Manager 100 was manufactured and distributed to the end user. Preferably, the Distribution Public Certificate DPubC is uniquely associated with the Token Manager 100. The Distribution Public Certificate DPubC includes a Distribution public encryption key DPubK. Preferably, the Distribution public encryption key DPubK and the Distribution private encryption key DPrivK comprise an asymmetric encryption key pair.

Similarly, the Activation Server 150 is provided with an Activation Server Public Certificate ASPubC, and a corresponding Activation Server private encryption key ASPrivK. The Activation Server Public Certificate ASPubC includes an Activation Server public encryption key ASPubK. Preferably, the Activation Server public encryption key ASPubK and the Activation Server private encryption key ASPrivK comprise an asymmetric encryption key pair. The Activation Server's Public Certificate ASPubC is signed by a Root Certificate Authority.

The Activation process is optional, and causes the Token Manager 100 to replace the Distribution private encryption key DPrivK with a Token Manager private key THPrivK, and to replace the Distribution Public Certificate DPubC with a Certificate Authority-signed Token Manager digital public certificate THPubC that includes a user public key THPubK corresponding to the private key THPrivK. The Activation process also causes the Token Manager 100 to be provided with a User private encryption key UPrivK and a Certificate Authority-signed User digital public certificate UPubC that includes a User public encryption key UPubK corresponding to the User private encryption key UPrivK.

The Activation Server 150 associates the Token Manager public certificate THPubC and the User Public Certificate UPubC with the Serial Number 321 of the Token Manager 100, thereby uniquely associating the Token Manager public certificate THPubC and the User Public Certificate UPubC with the Token Manager 100. The User Public Certificate UPubC is common to all of the Issuer Servers 140, and is used to register the Token Manager 100 for each Issuer Server 140.

Alternately, the Activation process might not cause the Token Manager 100 to be provided with a User private encryption key UPrivK and corresponding User digital public certificate UPubC, in which case the Distribution Public Certificate DPubC or the Token Manager public certificate THPubC could be used to for the Registration process (if implemented) and the Authentication process.

The Activation process is initiated, at step S500, when an un-activated Token Manager 100 (indicated by a Stains 322 of "Not Activated") is in the possession of the end-user and is interfaced with the Computer Host 120. At step S502, the Network Client 345 starts a new session of the web browser 400, connects to the Activation Server 150 (typically over a server side SSL/TLS encrypted communication channel) and sends the Serial Number 321 of the Token Manager 100 to the Activation Server 150 for identification purposes.

In response, the Activation Server 150 generates a session token, and may sign the session token using the Activation Server's private encryption key ASPrivK. As used in this description, a session token is an artefact, such as a random session number, that the issuing server uses to identify the current session. As will be apparent to those of ordinary skill, the Activation Server 150 signs the session token by computing a hash of the session token, and encrypting the hash and the session token with the Activation Server's private encryption key ASPrivK. Unless specified otherwise, the act of signing a datum using an encryption key in this description will refer to the act of encrypting the datum and the hash of the datum with the encryption key.

Optionally, the Activation Server 150 may also generate a pseudo-random code, such as a Server One-Time-Password (SOTP) using the One-Time-Password application 533, and sign the server pseudo-random code using the Activation Server's private encryption key ASPrivK.

The Activation Server 150 may then generate an encrypted activation message by encrypting the signed session token (and the signed server pseudo-random code, if generated) with the Distribution Public Certificate DPubC. Preferably, the Activation Server 150 embeds the encrypted activation message and the Activation Server's Public Certificate ASPubC in a browser cookie, and sends the cookie to the web browser 400, at step S504.

At step S506, the Network Client 345 forwards the encrypted activation message and the Activation Server's Public Certificate ASPubC to the Token Manager 100. Upon receipt, the Token Manager 100 validates the Activation Server's Public Certificate ASPubC by verifying that the Activation Server's Public Certificate ASPubC was signed by a Root Certificate Authority. If validated, the Token Manager 100 decrypts the encrypted activation message using the Distribution Private Key DPrivK. Otherwise, an error is generated and the Activation process aborts.

The Token Manager 100 then validates the signed session token using the Activation Server's Public Certificate ASPubC. As will be apparent to those of ordinary Skill, the Token Manager 100 validates the secret by decrypting the session token and the hashed session token using the public encryption key included in the Activation Server's Public Certificate ASPubC, computing a hash of the decrypted session token, and comparing the computed hash against the decrypted hash. Unless specified otherwise, the act of validating a signed datum using an encryption key in this description will refer to the act of decrypting the datum and the hashed datum with the encryption key, and computing a hash of the datum, and comparing the computed hash against the decrypted hash.

If the activation message included a signed server pseudo-random code, the signed server pseudo-random code may be validated using the Activation Server's Public Certificate ASPubC. The server pseudo-random code itself may be validated by comparing the server pseudo-random code against an expected value for the pseudo-random code. If the Token Manager 100 is implemented as a plug-in peripheral or as an internal device to the Computer Host 120, configured to interface with a hardware token 110, and the hardware token 110 includes a Chip Authentication Program application, the server pseudo-random code may be validated by the hardware token 110. Alternately, if the Token Manager 100 is implemented as a self-contained plug-in peripheral or a self-contained contactless device where the functionality of the hardware token 110 is embedded in the Token Manager 100, the server pseudo-random code may be validated by a suitable application on the Token Manager 100, such as the One-Time-Password application.

After the activation message has been validated, the Token Manager 100 or the Network Client 345 generates a credential from the Distribution Public Certificate DPubC of the Token Manager 100.

The Token Manager 100 or the Network Client 345 may implement the credential as a digital certificate. To generate the digital certificate, the Token Manager 100 or the Network Client 345 may generate a Session private encryption key SPrivK and a Session public encryption key SPubK, and may generate a Session Certificate SCert from the Session public encryption key SPubK. The Session private encryption key SPrivK and a Session public encryption key SPubK comprise an asymmetric encryption key pair. The Session Certificate SCert is populated with the Session public encryption key SPubK, the session token that was received from the Activation Server 150, a ValidFrom time/date and a ValidTo time/date, and the distinguished name (DN) of the Distribution Public Certificate DPubC. The ValidFrom and ValidTo time/date provides the Session Certificate SCert with a lifespan that is no longer than the lifespan of the Distribution Public Certificate DPubC of the Token Manager 100.

Optionally, the Token Manager 100 may also generate a pseudo-random code, such as a One-Time-Password (OTP), and incorporate the pseudo-random code into the Session Certificate SCert. If the Token Manager 100 is implemented as a plug-in peripheral or as an internal device to the Computer Host 120, configured to interface with a hardware token 110, and the hardware token 110 includes a Chip Authentication Program application, the pseudo-random code may be generated by the hardware token 110. Alternately, if the Token Manager 100 is implemented as a self-contained plug-in peripheral or a self-contained contactless device where the functionality of the hardware token 110 is embedded in the Token Manager 100, the pseudo-random code may be generated by a suitable application on the Token Manager 100, such as the One-Time-Password application.

The Token Manager 100 or the Network Client 345 then signs the Session Certificate SCert with the Distribution private encryption key DPrivK of the Token Manager 100. Since the Session Certificate SCert is derived from the Distribution Public Certificate DPubC, and the lifespan of the Session Certificate SCert is no longer than the lifespan of the Distribution Public Certificate DPubC, the Session Certificate SCert is a "child" certificate of the Distribution Public Certificate DPubC, and the Distribution Public Certificate DPubC is a "parent" certificate of the Session Certificate SCert.

The Network Client 345 stores the Session Certificate SCert and the Distribution Public Certificate DPubC in the Certificate Store 405, and stores the Session Private Key SPrivK in the Key Store 410. Since the Session Certificate SCert includes the session token that was received from the Activation Server 150, the Session Certificate SCert is uniquely associated with the Activation Server 150, in the sense that no other Session Certificate SCert signed with the Distribution private encryption key DPrivK would have this session token. Moreover, since the Session Certificate SCert is signed with the Distribution private encryption key DPrivK of the Token Manager 100, the Session Certificate SCert is uniquely associated with the Token Manager 100 in the sense that no other Token Manager 100 could have generated this Session Certificate SCert.

Alternately, instead of implementing the credential as a digital certificate, the Token Manager 100 may implement the credential as a pseudo-random code, such as a One-Time-Password (OTP). Preferably, the credential also includes the session token. As mentioned, if the Token Manager 100 is implemented as a self-contained plug-in peripheral or a self-contained contactless device where the functionality of the hardware token 110 is embedded in the Token Manager 100, the pseudo-random code may be generated by a suitable application on the Token Manager 100, such as the One-Time-Password application. The Token Manager 100 or the Network Client 345 may sign the pseudo-random code (and optionally the session token) with the Distribution private encryption key DPrivK of the Token Manager 100. Since the Session Certificate SCert is signed with the Distribution private encryption key DPrivK of the Token Manager 100, the pseudo-random code is uniquely associated with the Token Manager 100 in the sense that no other Token Manager 100 could have generated this pseudo-random code.

The Network Client 345 then uses the browser 400 to transmit the credential and the Distribution Public Certificate DPubC to the Activation Server 150, at step S508. The Activation Server 150 verifies that the Distribution Public Certificate DPubC was signed by the Root Certificate Authority and, if verified, validates the credential using the Distribution Public Certificate DPubC. As will be apparent to those of ordinary skill, the Activation Server 150 validates the credential by verifying the credential was signed with the Distribution private key DPrivK, and thereby verifies that the credential was generated from the Distribution Public Certificate DPubC. To do so, the Activation Server 150 decrypts the credential and the hashed credential with the Distribution public encryption key DPubK of the Distribution Public Certificate DPubC, computes a hash of the credential, and compares the computed hash against the decrypted hash. Unless specified otherwise, the act of validating a credential using a digital public certificate in this description will refer to the act of verifying that the credential was signed with the private encryption key that is associated with the public encryption key of the digital public certificate. If the credential included the session token, the Activation Server 150 may also validate the credential by verifying that the session token included in the credential matches the session token transmitted by the Activation Server 150, thereby verifying that the credential is associated with the Activation Server 150. If the credential included a pseudo-random code (whether transmitted as part of the Session Certificate SCert, or without any Session Certificate SCert), the Activation Server 150 may also validate the credential by comparing the pseudo-random code against an expected value for the pseudo-random code.

After the Activation Server 150 successfully validates the credential, the Activation Server 150 establishes a new communications session with the browser 400. Preferably, the browser 400 and the Activation Server 150 establish an encrypted session, using Activation Server's Public Certificate ASPubC, in the conventional manner. More preferably, the browser 400 and the Activation Server 150 establish a mutually-authenticated encrypted TLS session. If the credential comprised the Session Certificate SCert, preferably the browser 400 and the Activation Server 150 establish the mutually authenticated TLS session using the Session Certificate SCert and the Activation Server's Public Certificate ASPubC. If the credential comprised the pseudo-random code instead of the Session Certificate SCert, the Network Client 345 may provide the Activation Server 150 with a public certificate of the Token Manager 100, such as the Distribution public certificate DPubC, to facilitate establishment of the mutually authenticated session. Further, preferably the Token Manager 100 and the Activation Server 150 establish an encrypted session, such as a GlobalPlatform Secure Channel Protocol (SCP) session, within the TLS session, to thereby encrypt communications between the Token Manager 100 and the Activation Server 150.

If the browser 400 and the Activation Server 150 are unable to establish a session, an error is generated and the Activation process aborts. However, if the session is successfully established, the Token Manager 100 generates a new private key THPrivK and a corresponding public key THPubK, and stores the private key THPrivK and the public key THPubK respectively in the Private Key store 332 and the Certificate store 333. The private key THPrivK and the public key THPubK comprise an asymmetric encryption key pair.

The Token Manager 100 or the Network Client 345 generates a Certificate Signing Request CSR for the creation of a Token Manager's Public Certificate THPubC based on the Public Key THPubK of the Token Manager 100. The Token Certificate Signing Request CSR includes the Public Key THPubK. The Token Manager 100 or the Network Client 345 also signs the CSR and the Token Manager Serial Number 321 with the Distribution private key DPrivK. Preferably, the Token Manager 100 or the Network Client 345 then generates an encrypted activation message by encrypting the signed CSR and the Serial Number 321 with the Activation Server's Public Certificate ASPubC.

At step S510, the Network Client 345 uses the browser 400 to transmit the encrypted activation message to the Activation Server 150. The Activation Server 150 decrypts the encrypted activation message using the Activation Server's Private Key ASPrivK, and validates the signed CSR and Serial Number 321 using the Distribution Public Certificate DPubC. After the Activation Server 150 has validated the signed CSR and Serial Number 321, the Activation Server 150 determines whether the received Token Manager Serial Number 321 is valid by querying the Activation Database 535 for the Serial Number 321.

If the Token Manager Serial Number 321 is invalid, an error is raised and the Activation process aborts. Otherwise, at step S512, the Activation Server 150 transmits the CSR to the Certificate Authority 170 for signing. The Certificate Authority 170 signs the CSR, and returns the resulting Certificate Authority-signed Public Certificate THPubC, together with the Certificate Authority's Public Certificate THCAPubC, to the Activation Server 150 at step S514. The Activation Server 150 stores the Token Manager's Public Certificate THPubC in the Activation Database 535, together with the Token Manager Serial Number 321.

The Activation Server 150 signs the Token Manager's Public Certificate THPubC and the Certificate Authority's Public Certificate THCAPubC with the Activation Server's Private Key ASPrivK. The Activation Server 150 then uses the Distribution Public Certificate DPubC to encrypt the signed Token Manager's Public Certificate THPubC and Certificate Authority's Public Certificate THCAPubC. At step S516, the Activation Server 150 transmits the encrypted message to the Network Client 345, together with the Activation Server's Public Certificate ASPubC.

The Token Manager 100 or the Network Client 345 decrypts the encrypted message using the Distribution Private Key DPrivK, and verifies that the Activation Server's Public Certificate ASPubC was signed by the Root Certificate Authority. If verified, the Token Manager 100 or the Network Client 345 validates the Token Manager's Public Certificate THPubC and the Certificate Authority's Public Certificate THCAPubC using the Activation Server's Public Certificate ASPubC.

If the Token Manager's Public Certificate THPubC and the Certificate Authority's Public Certificate THCAPubC are validated, the Token Manager 100 or the Network Client 345 verifies that the Certificate Authority's Public Certificate THCAPubC was signed by the Root Certificate Authority. If verified, the Token Manager 100 or the Network Client 345 uses the Certificate Authority's Public Certificate THCAPubC to verify that the Token Manager's Public Certificate THPubC was signed by the Certificate Authority 170. If the signature on the Token Manager's Public Certificate THPubC is invalid, an error is raised and the Activation process aborts. Otherwise, the Token Manager 100 saves the Token Manager's Public Certificate THPubC, in the Certificate Database 333, in replacement of the Distribution Public Certificate DPubC. The Token Manager 100 then updates the Token Status 322 to "Activated with NoUserCert".

The Token Manager 100 or Network Client 345 then generates a Successful Update Notification message, signs the Successful Update Notification message with the Token Manager's Private Key THPrivK, encrypts the signed message with the Activation Server's Public Certificate ASPubC, and transmits the encrypted message to the Activation Server 150, at step S518. The Activation Server 150 decrypts the encrypted message with the Activation Server's Private Key ASPrivK, and then verifies the signature on the Successful Update Notification message using the Token Manager's Public Certificate THPubC.

In response, the Activation Server 150 generates a Received Successful Update Notification message, signs the Received Successful Update Notification message with the Activation Server's Private Key ASPrivK, encrypts the signed message with the Token Manager's Public Certificate THPubC, and transmits the encrypted message to the Network Client 345. The Token Manager 100 or the Network Client 345 decrypts the encrypted message with the Token Manager Private Key THPrivK, and verifies the signature on the Received Successful Update Notification message using the Activation Server's Public Certificate ASPubC.

Upon successful verification of the Received Successful Update Notification message, the Token Manager 100 may generate a new User Private Key UPrivK and a corresponding User Public Key UPubK, and store the private key UPrivK and the public key UPubK respectively in the Private Key store 332 and the Certificate store 333. The User private key UPrivK and the User public key UPubK comprise an asymmetric encryption key pair. The User Private Key UPrivK and the corresponding User Public Key UPubK are uniquely associated with the Token Manager 100.

The Token Manager 100 or the Network Client 345 may then generate a User Certificate Signing Request UCSR for the creation of a User Public Certificate UPubC based on the User Public Key UPubK. The User Certificate Signing Request UCSR includes the User Public Key UPubK. The Token Manager 100 or the Network Client 345 also signs the UCSR and the Serial Number 321 with the Token Manager THPrivK. Preferably, the Token Manager 100 or the Network Client 345 then generates an encrypted activation message by encrypting the signed UCSR and Serial Number 321 with the Activation Server's Public Certificate ASPubC.

At step S520, the Network Client 345 uses the browser 400 to transmit the encrypted activation message to the Activation Server 150. The Activation Server 150 decrypts the encrypted activation message using the Activation Server's Private Key ASPrivK, and validates the signed UCSR and the signed Serial Number 321 using the Token Manager's Public Certificate THPubC. After the Activation Server 150 has validated this data, the Activation Server 150 transmits the User Certificate Signing Request UCSR to the Certificate Authority 170 for signing. The Certificate Authority 170 signs the UCSR, and returns the resulting Certificate Authority-signed User Certificate UPubC, together with the Certificate Authority's Public Certificate THRootCAPubC, to the Activation Server 150. The Activation Server 150 stores the User Public Certificate UPubC, together with the Token Manager Serial Number 321, in the Activation Database 535. As will become apparent, the User Public Certificate UPubC serves as an authentication payload that facilitates authentication of the Network Client 345 to the Issuer Server 140.

The Activation Server 150 signs the authentication payload and the Certificate Authority's Public Certificate THRootCAPubC with the Activation Server's Private Key ASPrivK. The Activation Server 150 then generates an encrypted message by encrypting the signed authentication payload and the signed Certificate Authority's Public Certificate THRootCAPubC using the Token Manager Public Certificate THPubC. At step S522, the Activation Server 150 transmits the encrypted message to the Network Client 345.

The Token Manager 100 or the Network Client 345 decrypts the encrypted message using the Token Manager Private Key THPrivK, and verifies that the Activation Server's Public Certificate ASPubC was signed by the Root Certificate Authority. If verified, the Token Manager 100 or the Network Client 345 validates the signed User Public Certificate UPubC and the signed Certificate Authority's Public Certificate THRootCAPubC using the Activation Server's Public Certificate ASPubC.

If the User Public Certificate UPubC and the Certificate Authority's Public Certificate THRootCAPubC are validated, the Token Manager 100 or the Network Client 345 verifies that Certificate Authority's Public Certificate THRootCAPubC was signed by the Root Certificate Authority. If verified, the Token Manager 100 or the Network Client 345 uses the Certificate Authority's Public Certificate THRootCAPubC to verify that the User Public Certificate UPubC was signed by the Certificate Authority 170. If the signature on the User Public Certificate UPubC is invalid, an error is raised and the Activation process aborts. Otherwise, the Token Manager 100 saves the User Private Key UPrivK in the User Private Key store 326, and saves the User Public Certificate UPubC in the User Certificate store 327. The Token Manager 100 then updates the Token Status 322 to "Activated with UserCert". Since the User Private Key UPrivK and the corresponding User Public Key UPubK are uniquely associated with the Token Manager 100, the User Public Certificate UPubC is uniquely associated with the Token Manager 100.

At step S524, the Token Manager 100 or the Network Client 345 then generates a Successful Update Notification message, signs the Successful Update Notification message with the Token Manager Private Key THPrivK, encrypts the signed message with the Activation Server's Public Certificate ASPubC, and transmits the encrypted message to the Activation Server 150. The Activation Server 150 decrypts the encrypted message with, the Activation Server's Private Key ASPrivK, and then verifies the signature on the Successful Update Notification message using the Token Manager's Public Certificate THPubC.

In response, the Activation Server 150 generates a Received Success message, signs the Received Success message with the Activation Server's Private Key ASPrivK, encrypts the signed message with the Token Manager's Public Certificate THPubC, and transmits the encrypted message to the Network Client 345. The Token Manager 100 or the Network Client 345 decrypts the encrypted message with the Token Manager Private Key THPrivK, and then verifies tire signature on the Received Success message using the Activation Server's Public Certificate ASPubC. The Activation process ends upon successful verification of the Received Success message.

If the Token Manager 100 is implemented either as a plug-in peripheral or as an internal device to the Computer Host 120, configured to interface with a hardware token 110, one or more of the foregoing steps of the Token Manager 100 may be performed by the hardware token 110.

Token Manager Registration

Figure 6A:
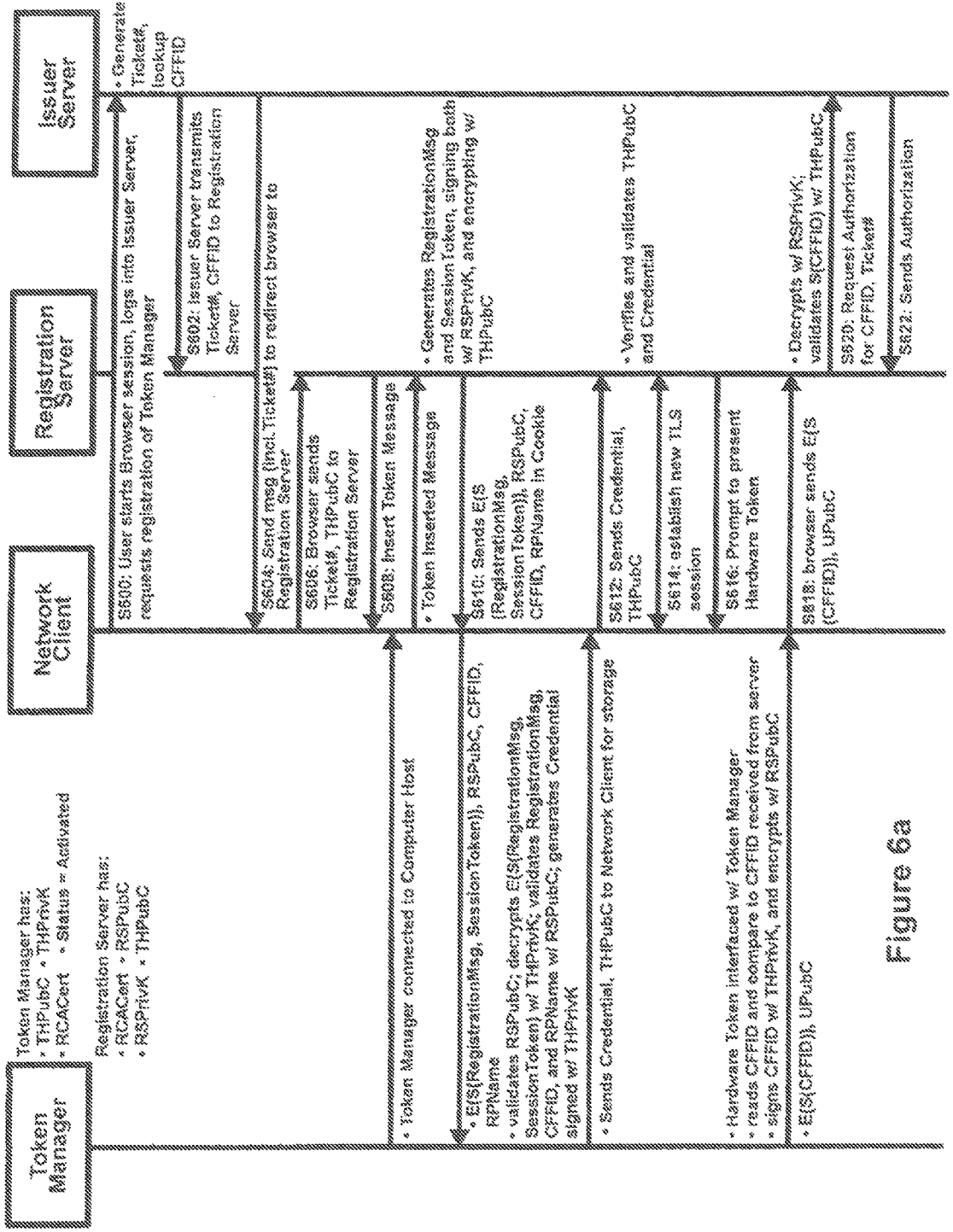
FIGS. 6a and 6b together comprise a message flow diagram that depicts the transmission of messages during an optional Registration process implemented by the Token Manager.
Figure 6B:
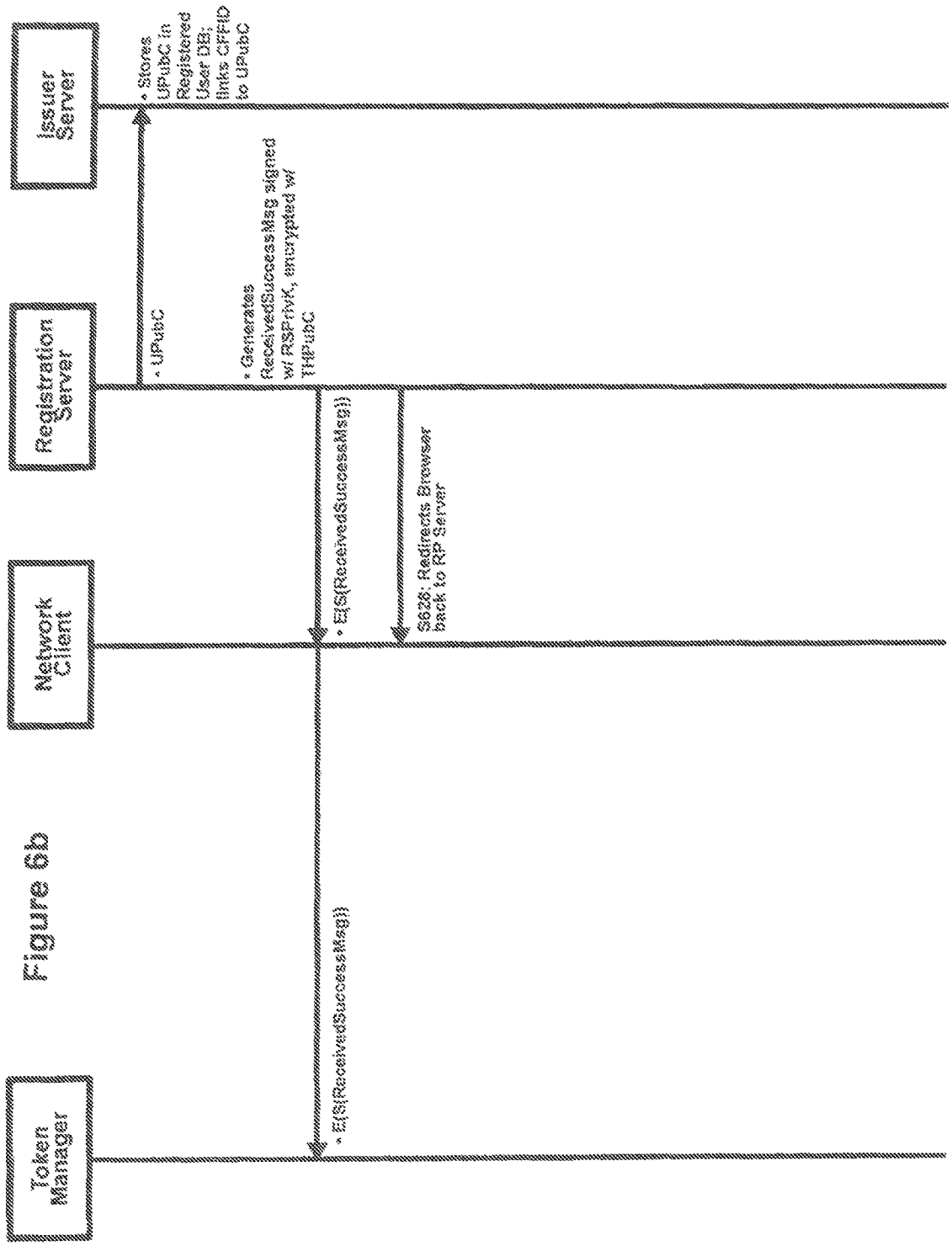

The Registration process that may be implemented by the Token Manager 100 will now be described with reference to FIGS. 6a and 6b. The Token Manager 100 includes a Token Manager Public Certificate THPubC, and a corresponding private encryption, key THPrivK, both of which may have been installed on the Token Manager 100 during the Activation process. The Token Manager 100 may also have a User private encryption key UPrivK and a Certificate Authority-signed User digital public certificate UPubC that includes a User public encryption key UPubK corresponding to the User private encryption key UPrivK. The Activation Server 150 has a copy of the Token Manager Public Certificate THPubC and the User public certificate UPubC, and maintains a link between the Token Manager Public Certificate THPubC, the User public certificate UPubC and the associated Token Manager 100.

Similarly, the Issuer Server 140 is provided with a Issuer Server Public Certificate RSPubC, and a corresponding Issuer Server private encryption key RSPrivK. The Issuer Server Public Certificate RSPubC includes an Issuer Server public encryption key RSPubK. Preferably, the Issuer Server public encryption key RSPubK and the Issuer Server private encryption key RSPrivK comprise an asymmetric encryption key pair. The Issuer Server's Public Certificate RSPubC is signed by a Root Certificate Authority.

The Token Manager 100 uses the User public certificate UPubC to register the Token Manager 100 for use with each Issuer Server 140. The Registration process is optional, and causes the Issuer Server 140 to be provided with a copy of the User public certificate UPubC, and to associate the User public certificate UPubC with a hardware token 110 provided or trusted by the Issuer associated with the Issuer Server 140. The Token Manager 100 registers the same User public certificate UPubC with each Issuer Server 140, such that the User public certificate UPubC is common to all of the Issuer Servers 140. Alternately, the Activation process might not have provided the Token Manager 100 with a User public certificate UPubC, in which case the Token Manager 100 may use the Token Manager public certificate THPubC to register the Token Manager 100 with each Issuer Server 140.

The Registration Process is initiated, at step S600, when a user starts a new session of the web browser 400, successfully logs in to a Issuer Server 140 (typically over a server side SSL/TLS encrypted communication channel), and requests Registration of the Token Manager 100. In response, the Issuer Server 140 queries backend systems with the user's User-ID for a set of token identifiers that is associated with and identifies the authenticator(s) (e.g. Token Manager 100, hardware token 110) that have been assigned to the user. The backend systems know the relationship between each user's User-ID and the token identifier of each of the user's authenticator(s) since the authenticates were either issued to the user by the Issuer associated with the Issuer Server 140, or were issued to the user by another Issuer and the backend systems were made aware of the relationship.

Preferably, the Token Manager 100 is implemented as a plug-in peripheral or as an internal device to the Computer Host 120, configured to interface with a hardware token 110, the authenticator comprises a hardware token 110, and the token identifier is associated with that hardware token 110. However, if the Token Manager 100 is implemented as a self-contained plug-in peripheral or a self-contained contactless device where the functionality of the hardware token 110 is embedded in the Token Manager 100, the authenticator comprises the Token Manager 100, and the token identifier is associated with the Token Manager 100.

Typically, the token identifier is uniquely associated with the authenticator, such as a unique identification code or a serial number of the hardware token 110 or the Token Manager 100. However, the token identifier need not be uniquely associated with the authenticator, but may instead identify a group or class type of the authenticator. By way of example, the token identifier might indicate that the hardware token 110 required to effect registration must be a banking card. Other hardware tokens are contemplated herein, including credit card, loyalty card, building access pass, driver's license, health card, and passport. Preferably, the token identifier does not disclose sensitive information about the user, such as the user's bank account number, credit card number, driver's license number, or other data that could be used to impersonate the user.

After the Issuer Server 140 has acquired the token identifier of the authenticator that is required to effect registration, the Issuer Server 140 generates a random Registration Ticket number, and associates the token identifier with the Registration Ticket number. At step S602, the Issuer Server 140 then transmits a registration message to the Registration Server 160, over a secure channel, which includes the token identifier, the assigned Registration Ticket number and the distinguished name (DN) of the Issuer Server 140. The registration message may also include a six-digit Issuer Identification Number (referred to herein as the SIIN) which may be used during the Authentication process to route authorization requests from Relying Party Servers 135 to the correct Issuer Server 140. At step S604, the Issuer Server 140 issues to the browser 400 a redirection message that includes the Registration Ticket number, and redirects the browser 400 to the Registration Server 160.

The browser 400 connects to the Registration Server 160 (typically over a server side SSL/TLS encrypted communication channel) at step S606, and provides the Registration Server 160 with the received Registration Ticket number and the Token Manager's Public Certificate THPubC for identification purposes. At step S608, the Registration Server 160 causes the computer browser 400 to display a message instructing the user to physically interface the Token Manager 100 with the Computer Host 120 (unless the Token Manager 100 is implemented as an internal device to the Computer Host 120).

After the Token Manager 100 is physically interfaced with the Computer Host 120, the Registration Server 160 generates a registration message RegistrationMsg, and a session token, such as a random session number, and may sign the registration message RegistrationMsg, session token, token identifier, SIIN and DN using the Registration Server's private encryption key RSPrivK. Optionally, the Registration Server 160 may also generate a pseudo-random code, such as a Server One-Time-Password (SOTP) using the One-Time-Password application 543, and sign the server pseudo-random code using the Registration Server's private encryption key RSPrivK.

The Registration Server 160 may then encrypt the signed registration message RegistrationMsg and the signed session token (and the signed server pseudo-random code, if generated) with the Token Manager's Public Certificate THPubC. Preferably, the Registration Server 160 embeds the encrypted data and the Registration Server's Public Certificate RSPubC in a browser cookie, and sends the cookie to the browser 400, at step S610.

The Network Client 345 forwards the encrypted data and the Registration Server's Public Certificate RSPubC to the Token Manager 100. Upon receipt, the Token Manager 100 or the Network Client 345 validates the Registration Server's Public Certificate RSPubC by verifying that the Registration Server's Public Certificate RSPubC was signed by a Root Certificate Authority. If validated, the Token Manager 100 decrypts the data using the Token Manager's private key THPrivK; otherwise, an error is generated and the Registration process aborts. The Token Manager 100 then validates the signed RegisirationMsg, token identifier, and the DN using the Registration Server's Public Certificate RSPubC.

If a signed server pseudo-random code was transmitted with the registration message RegistrationMsg, the signed server pseudo-random code may be validated using the Registration Server's Public Certificate RSPubC. The server pseudo-random code itself may be validated by comparing the server pseudo-random code against an expected value for the pseudo-random code. If the Token Manager 100 is implemented as a plug-in peripheral or as an internal device to the Computer Host 120, configured to interface with a hardware token 110, and the hardware token 110 includes a Chip Authentication Program application, the server pseudo-random code may be validated by the hardware token 110. Alternately, if the Token Manager 100 is implemented as a self-contained plug-in peripheral or a self-contained contactless device where the functionality of the hardware token 110 is embedded in the Token Manager 100, the server pseudo-random code may be validated by a suitable application on the Token Manager 100, such as the One-Time-Password application.

After the RegistrationMsg, token identifier, and DN have been validated, the Token Manager 100 or the Network Client 345 generates a credential from the Token Manager Public Certificate THPubC.

The Token Manager 100 or the Network Client 345 may implement the credential as a digital certificate. To generate the digital certificate, the Token Manager 100 or the Network Client 345 may generate a Session private encryption key SPrivK and a Session public encryption key SPubK, and may generate a Session Certificate SCert from the Session public encryption key SPubK. The Session private encryption key SPrivK and a Session public encryption key SPubK comprise an asymmetric encryption key pair. The Session Certificate SCert is populated with the Session public encryption key SPubK, the session token that was received from the Registration Server 160, a ValidFrom time/date and a ValidTo time/date, and the distinguished name (DN) of the Token Manager Public Certificate THPubC. The ValidFrom and ValidTo time/date provides the Session Certificate SCert with a lifespan that is no longer than the lifespan of the Token Manager Public Certificate THPubC.

Optionally, the Token Manager 100 may also generate a pseudo-random code, such as a One-Time-Password (OTP), and incorporate the pseudo-random code into the Session Certificate SCert. The pseudo-random code may be generated by a suitable application on the Token Manager 100, such as the One-Time-Password application.

The Token Manager 100 or the Network Client 345 then signs the Session Certificate SCert with the Token Manager private encryption key THPrivK. Since the Session Certificate SCert is derived from the Token Manager Public Certificate THPubC, and the lifespan of the Session Certificate SCert is no longer than the lifespan of the Token Manager Public Certificate THPubC, the Session Certificate SCert is a "child" certificate of the Token Manager Public Certificate THPubC, and the Token Manager Public Certificate THPubC is a "parent" certificate of the Session Certificate SCert.

The Network Client 345 stores the Session Certificate SCert and the Token Manager Public Certificate THPubC in the Certificate Store 405, and stores the Session Private Key SPrivK in the Key Store 410. Since the Session Certificate SCert includes the session token that was received from the Registration Server 160, the Session Certificate SCert is uniquely associated with the Registration Server 160, in the sense that no other Session Certificate SCert signed with the Token Manager private encryption key THPrivK would have this session token. Moreover, since the Session Certificate SCert is signed with the Token Manager private encryption key THPrivK, the Session Certificate SCert is uniquely associated with the Token Manager 100 in the sense that no other Token Manager 100 could have generated this Session Certificate SCert. Therefore, this Session Certificate SCert is uniquely associated with the Token Manager 100 and the Registration Server 160, in the sense that this Session Certificate SCert is only associated with this combination of Token Manager 100 and Registration Server 160.

Alternately, instead of implementing the credential as a digital certificate, the Token Manager 100 may implement the credential as a pseudo-random code, such as a One-Time-Password (OTP), using a suitable application on the Token Manager 100, such as the One-Time-Password application. Preferably, the credential also includes the session token. The Token Manager 100 or the Network Client 345 may sign the pseudo-random code (and optionally the session token) with the Token Manager private encryption key THPrivK. Since the pseudo-random code is signed with the Token Manager private encryption key THPrivK, the pseudo-random code is uniquely associated with the Token Manager 100 in the sense that no other Token Manager 100 could have generated this pseudo-random code.

The Network Client 345 then uses the browser 400 to transmit the credential and the Token Manager Public Certificate THPubC to the Registration Server 160, at step S612. The Registration Server 160 verifies that the Token Manager Public Certificate THPubC was signed by the Root Certificate Authority and, if verified, validates the credential using the Token Manager Public Certificate THPubC, thereby verifying that the credential was generated from the Token Manager Public Certificate THPubC. If the credential included the session token, the Registration Server 160 may also validate the credential by verifying that the session token included in the credential matches the session token transmitted by the Registration Server 160, thereby verifying that the credential is uniquely associated with the Registration Server 160. If the credential included a pseudo-random code (whether transmitted as part of the Session Certificate SCert, or without any Session Certificate SCert), the Registration Server 160 may also validate the credential by comparing the pseudo-random code against an expected value for the pseudo-random code.

After the Registration Server 160 successfully validates the credential, at step S614 the Registration Server 160 establishes a new communication session with the browser 400. Preferably, the browser 400 and the Registration Server 160 establish an encrypted session, using Registration Server's Public Certificate RSPubC, in the conventional manner. More preferably, the browser 400 and the Registration Server 160 establish a mutually-authenticated encrypted TLS session. If the credential comprised the Session Certificate SCert, preferably the browser 400 and the Registration Server 160 establish the mutually authenticated TLS session using the Session Certificate SCert and the Registration Server's Public Certificate RSPubC. If the credential comprised the pseudo-random code instead of the Session Certificate SCert, the Network Client 345 may provide the Registration Server 160 with a public certificate of the Token Manager 100, such as the Token Manager public certificate THPubC, to facilitate establishment of the mutually authenticated session. Further, preferably the Token Manager 100 and the Registration Server 160 establish an encrypted session, such as a GlobalPlatform Secure Channel Protocol (SCP) session, within the TLS session, to thereby encrypt communications between the Token Manager 100 and the Registration Server 100.

If the browser 400 and the Registration Server 160 are unable to establish a session, an error is generated and the Registration process aborts. However, if the session is successfully established, at step S616 the Registration Server 160 causes the browser 400 to display a message instructing the user to physically interface an authenticator with the Computer Host 120. In response, typically the user will interface a hardware token 110 with the Token Manager 100 (unless the Token Manager 100 is implemented as a self-contained plug-in peripheral or a self-contained contactless device where the functionality of the hardware token 110 is embedded in the Token Manager 100).

After the hardware token 110 is physically interfaced with the Token Manager 100, the Token Manager 100 or the Network Client 345 may validate the hardware token 110.

To do so, the Token Manager 100 may read the token identifier from the hardware token 110, and the Token Manager 100 or the Network Client 345 may determine whether the token identifier that was read from the hardware token 110 matches any one of the token identifiers required by the Issuer Server 140 (transmitted to the Token Manager 100 by the Registration Server 160). Alternately, if the Token Manager 100 is implemented as a self-contained plug-in peripheral or a self-contained contactless device where the functionality of the hardware token 110 is embedded in the Token Manager 100, the Token Manager 100 or Network Client 345 may determine whether the token identifier that was read from the Token Manager 100 (such as the Serial Number 321) matches the token identifier received from the Registration Server 160. As discussed above, typically the token identifier is uniquely associated with the authenticator (e.g. Token Manager 100, hardware token 110). However, the token identifier may identify a group or class type of authenticator.

If the token identifier reveals that that the hardware token 110 (or the Token Manager 100) is not valid, an error is raised and the Registration process ends. However, if the token identifier reveals that the hardware token 110 (or the Token Manager 100) is valid, the Token Manager 100 or the Network Client 345 signs the Token Manager Serial Number 321 and the token identifier of the hardware token 110 for the Token Manager 100) with the Token Manager THPrivK.

Optionally, the Token Manager 100 may request token presence data from the hardware token 110, and sign the token presence data with the Token Manager private key THPrivK. Typically the token presence data is different from the token identifier, and is used by the Relying Party Server 140 to confirm that the hardware token 110 was physically presented to the Token Manager 100 during the Registration process. The token presence data may comprise a static secret, or a token pseudo-random code, such as a Token One-Time Password (TOTP), generated by a Chin Authentication Program application on the hardware token 110. Alternately, the token presence data may comprise dynamically-generated data.

If the hardware token 110 is configured as an EMV payment card, the dynamically-generated data may comprise a cryptogram, that is generated from data originating from the hardware token 110. To compute the cryptogram, the Token Manager 100 may send a random number to the hardware token 110, and the hardware token 110 generates the cryptogram from the random number, an internal card counter number and a diversified key, such as a triple-DES (Data Encryption Standard) key, of the hardware token 110. The hardware token 110 may then send the cryptogram to the Token Manager 100.

If the hardware token 110 is configured as a magnetic stripe card, the dynamically-generated data token may comprise a dynamic Card Verification Value (CVV) that is generated front data originating from the hardware token 110. To compute the dynamic CVV, the Token Manager 100 may send a random number to the hardware token 110, and the hardware token 110 generates the dynamic CVV from the random number, an internal card counter number and a diversified key of the hardware token 110. The hardware token 110 may then send the dynamic CVV to the Token Manager 100, either as part of the hardware token's Track 2 discretionary data, or independently of any Track 2 discretionary data.

Alternately, if the hardware token 110 is configured as a EMV payment card, the token presence data may comprise a dynamic CVV that is generated from data originating from the hardware token 110. To compute the dynamic CVV, the Token Manager 100 may request an internal card counter number and a diversified key, such as a triple-DES key, from the hardware token 110. The Token Manager 100 may then generate a random number, and compute the dynamic CVV using the random number, the internal card counter number and the diversified key as inputs to a suitable cipher algorithm.

Preferably, the Token Manager 100 or the Network Client 345 then generates an encrypted registration message by encrypting the signed Token Manager Serial Number 321 and signed token identifier (and, if generated, the token presence data, random number and internal card counter) with the Registration Server's Public Certificate RSPubC.

At step S618, the Token Manager 100 transmits the User Public Certificate UPubC to the Network Client 345, and the Network Client 345 uses the browser 400 to transmit the encrypted registration message to the Registration Server 160, together with the User Public Certificate UPubC. The Registration Server 160 decrypts the encrypted registration message using the Registration Server's Private Key RSPrivK, and validates the signed token identifier using the Token Manager's Public Certificate THPubC. After the Registration Server 160 has validated this data, at step S620 the Registration Server 160 transmits to the Issuer Server 140, over a secure channel, a Registration Authorization request message that includes the Registration Ticket number (previously transmitted by the browser 400 to the Registration Server 160 at step S606) and the token identifier (and, if generated, the token presence data, random number and internal card counter).

In the variation where the hardware token 110 generated token presence data, the Issuer Server 140 may validate the token presence data by comparing the token presence data against an expected value for the token presence data. This latter step allows the Issuer Server 140 to verify that the hardware token 110 was actually presented during the Registration process. As will be apparent, if the token presence data comprises a token pseudo-random code or static secret, the Issuer Server 140 validates the credential by comparing the token pseudo-random code against an expected value. If the token presence data comprises dynamically-generated data, the Issuer Server 140 typically already has a copy of the diversified key of the hardware token 110, and validates the credential by generating a reference value from the random number, the internal card counter number and tire diversified key, and comparing the generated reference value against the received dynamically-generated data.

Alternatively, the Issuer Server 140 or the Token Manager 100 may provide a random datum, such as an unpredictable number, to the hardware token 110, and the hardware token 110 may generate dynamic data by signing the random datum with its private key (or diversified key), and send the signed datum to the Issuer Server 140 over a secure channel (such as a SCP session). The Issuer Server 140 could then decrypt the encrypted dynamic data, and validate the signed data to confirm presence of the hardware token 110.

If the token presence data cannot be validated, or if the Issuer Server 140 did not associate the Registration Ticket number with the token identifier (at step S600), an error is raised and the Registration process aborts.

Otherwise, at step S622, the Issuer Server 140 issues the Registration Server 160 an authorization message, whereupon the Registration Server 160 transmits to the Issuer Server 140, over a secure channel, a Registration Completion message that includes the Registration Ticket number and the Uses Public Certificate UPubC. Optionally, the Registration Completion message also includes the Serial Number 321. The Issuer Server 140 saves the User Public Certificate UPubC in the Registered User Database 520, and links the token identifier (and optionally the Serial Number 321) to the User Public Certificate UPubC via the User-ID. The Issuer Server 140 also updates the Registered User Database 520 with the user's User-ID, to indicate that the user has registered a Token Manager 100 with the Issuer.

The Registration Server 160 then generates a Received Successful Update Notification message, signs the Received Successful Update Notification message with the Registration Server's Private Key RSPrivK, encrypts the signed message with the Token Manager's Public Certificate THPubC, and transmits the encrypted message to the Network Client 345. As will be apparent, the Received Successful Update Notification message is transmitted to the Network Client 345 only if both the credential and the token identifier of the hardware token 110 are determined to be valid.

The Token Manager 100 or the Network Client 345 decrypts the encrypted message with the Token Manager Private Key THPrivK, and then verifies the signature on the Received Successful Update Notification message using the Registration Server's Public Certificate RSPubC. If the Received Successful Update Notification message is verified, the Token Manager 100 associates the User Public Certificate UPubC with the token identifier of the authenticator that was interfaced with the Computer Host 120.

The Registration Process ends upon successful verification of the Received Successful Update Notification message. At step S628, the Registration Server 160 redirects the browser 400 back to the Issuer Server 140.

If the Token Manager 100 is implemented either as a plug-in peripheral or as an internal device to the Computer Host 120, configured to interface with a hardware token 110, one or more of the foregoing steps of the Token Manager 100 may be performed by the hardware token 110.

Token Manager Authentication

The Token Manager 100 may be configured to implement one of a plurality of different Authentication processes. Three sample embodiments of the Authentication process are described herein with reference to FIGS. 7 to 9.

Token Manager Authentication Process (Embodiment #1)

Figure 7:
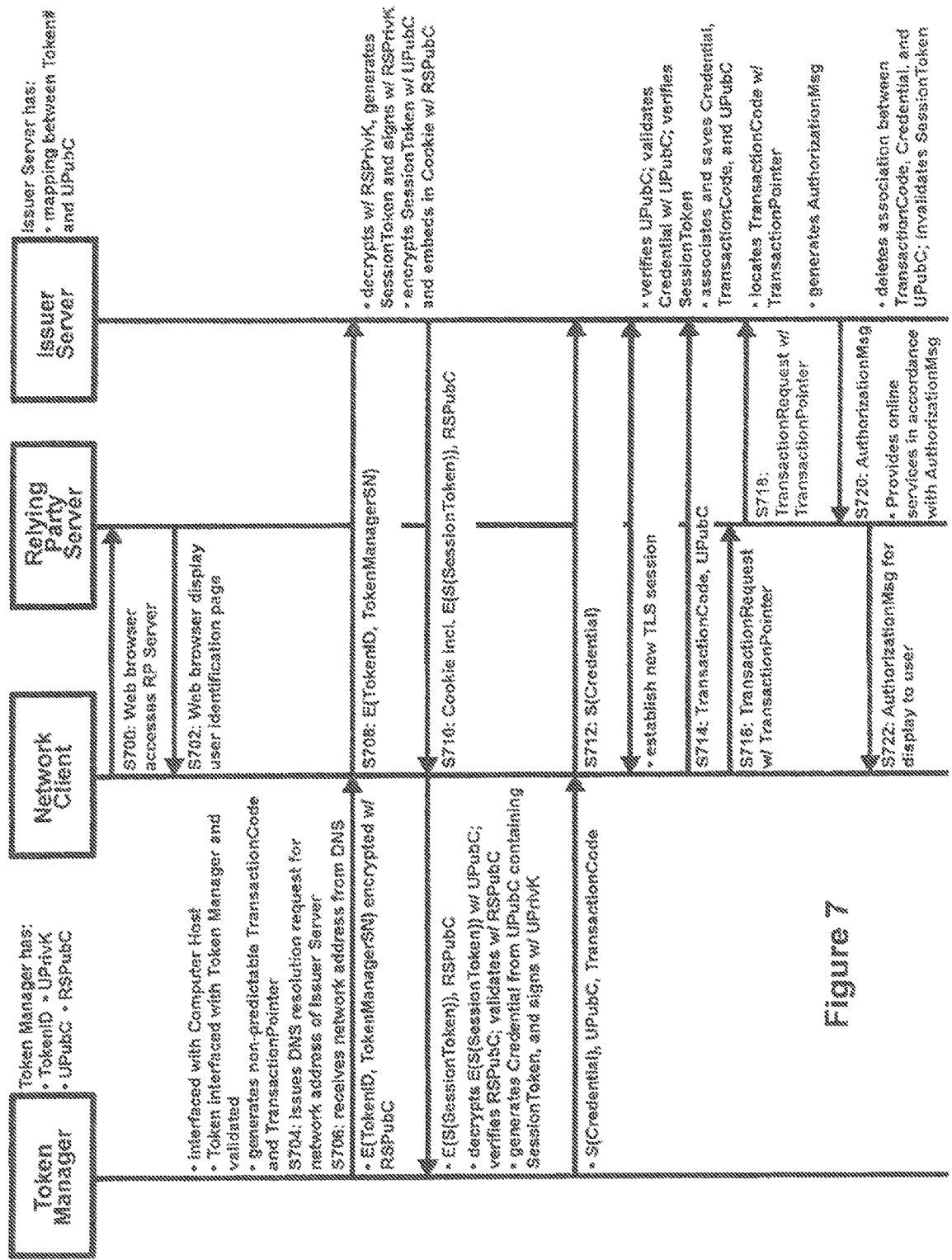
FIG. 7 is a message flow diagram that depicts the transmission of messages during a first embodiment of an Authentication process implemented by the Token Manager.

The first embodiment of the Authentication process will now be described with reference to FIG. 7. In this first embodiment, the Issuer Server 140 maintains an association between each user's User Public Certificate UPubC, hardware token number and the token identifier of the hardware token 110 (provided or trusted by the Issuer associated with the Issuer Server 140). After the user accesses a Relying Party Server 135 using the Host Computing Device 120, the Issuer Server 140 may authorize the user (via the Token Manager 100 and the Computer Host 120) to receive online services from the Relying Party Server 135.

As will be discussed in greater detail below, prior to authorizing the user the Token Manager 100 transmits a transaction code to the Issuer Server 140, over a first communications channel. Preferably, the transaction code is unpredictable by the issuer Server 140.

When the user wishes to receive online services from the Relying Party Server 135, the Network Client 345 provides the Relying Party Server 135 with a transaction request (for the online services) that includes a transaction pointer. Via a second communications channel that is distinct from the first communications channel, the Relying Party Server 135 transmits the transaction request to the Issuer Server 140 for authorization of the transaction request. Preferably, the transaction pointer is unpredictable by the Issuer Server 140.

The hardware token 110 may generate the transaction pointer from the transaction code.

The Network Client 345 may transmit the transaction pointer to the Relying Party 135 in a hardware token identifier field of a web page hosted by the Relying Party Server 135. Preferably the Issuer Server 140 receives the transaction code prior to receiving the transaction pointer. The Issuer Server 140 transmits to the Relying Party Server 135 an authorization signal (that facilitates authentication of the Network Client 345 to the Relying Pasty Server 135) based on a correlation between the transaction code and the transaction pointer.

Before receiving the transaction pointer from the Relying Party 135, the Issuer Server 140 may transmit the transaction pointer to the Token Manager 100 via the first communications channel.

The first embodiment of the Authentication process is initiated, at step S700 when the user starts a new session of the web browser 400 and accesses the Relying Party Server 135 (typically over a server side SSL/TLS encrypted communication channel). The user then attempts to receive online services from the Relying Party Server 135 (e.g. access secure online accounts or databases, securely download or upload files from/to the Relying Party Server), for example by selecting an appropriate link on the website hosted by the Relying Party Server 135. In response, at step S702 the Relying Party website causes the Computer Host 120 to display a web page prompting the user to provide user identification information (such as the user's first name, last name and address) and the token number of the user's hardware token 110 and the associated Card Verification Value (CVV), and to interface the user's hardware token 110 with the Token Manager 100. If the Relying Pasty requires payment for the online services, the web page may also specify a required payment amount.

The user interfaces the Token Manager 100 to the Computer Host 120 and interfaces their hardware token 110 with the Token Manager 100 (unless the Token Manager 100 is implemented as a self-contained plug-in peripheral or a self contained contactless device where the functionality of the hardware token 110 is embedded in the Token Manager 100).

After the hardware token 110 is interfaced with the Token Manager 100, the Token Manager 100 may validate the hardware token 110. To do so, the Token Manager 100 may read from the hardware token 110 the token identifier of the hardware token 110, and the Token Manager 100 or the Network Client 345 may determine whether the token identifier matches any one of the token identifiers that were stored on the Token Manager 100 during the Registration process. As discussed above, typically the token identifier is uniquely associated with the Token Manager 100. However, alternately the token identifier may identify a group or class type of authenticator.

If the token identifier reveals that that the hardware token 110 is not valid (i.e. the hardware token 110 is not associated with the Token Manager 100), an error is raised and the Authentication process ends. However, if the token identifier reveals that the hardware token 110 is valid, the hardware token 110 may generate a transaction code that is not predictable by the Issuer Server 140, and pass the transaction code to the Token Manager 100.

The hardware token 110 may dynamically generate the transaction code upon interfacing the hardware token 110 with the Token Manager 100. Alternately, the Issuer Server 140 or the Token Manager 100 may generate non-predictable data, and the hardware token 110 may generate the transaction code from the non-predictable data as received from the Issuer Server 140 (via the first communications channel) or the Token Manager 100.

For example, if the hardware token 110 is configured as an EMV payment card, the transaction code may comprise a cryptogram, that is dynamically-generated from data originating from the hardware token 110. To compute the cryptogram, the Token Manager 100 may send a random number to the hardware token 110, and the hardware token 110 generates the cryptogram from the random number, an internal card counter number and a diversified key, such as a triple-DES (Data Encryption Standard) key, of the hardware token 110. The hardware token 110 may then send the transaction code (cryptogram) to the Token Manager 100.

The Token Manager 100 or the Network Client 345 may then generate a transaction pointer from the transaction code. Preferably, the transaction pointer is not predictable by the Issuer Server 140. The transaction pointer may have the format of a payment or credit card number. For example, the transaction pointer may have the format: SIIN+transaction code+SDCS, where the SIIN was provided to the Token Manager 100 during the Registration process, and SDCS is a single digit check sum that is calculated preferably using the Luhn algorithm.

The Token Manager 100 may then interface with the Network Client 345 to push the transaction pointer into the hardware token identifier field of the web page of the Relying Party Server 135.

Preferably the Network Client 345 is configured with programmatic logic that is based on standard "form filler" technology that automatically enters the transaction pointer into the token identifier field of the web page. This variation alleviates the problem of the user having to put the cursor focus on the appropriate field of the web page prior to interfacing the hardware token 110 with the Token Manager 100.

At step S704, the Token Manager 100 issues a DNS resolution request to an appropriate DNS requesting the network address of the Issuer Server 140 associated with the SIIN. The DNS responds to the Token Manager 100 with the resolved network address, at step S706.

At step S708, the Token Manager 100 generates a session token request message that includes the token identifier of the hardware token 110 (and/or the Serial Number 321 of the Token Manager 100), and encrypts the session token request message with the Issuer Server's public certificate RSPubC. The Token Manager 100 transmits the session token request message to the Issuer Server 140 at the network address specified by the DNS. The Issuer Server 140 decrypts the session token request message with the Issuer Server's private key RSPrivK, generates a session token, such as a random session number, and may sign the session token with the Issuer Server's private key RSPrivK. Optionally, the Issuer Server 140 may also generate a pseudo-random code, such as a Server One-Time-Password (SOTP) using the One-Time-Password application 516, and sign the server pseudo-random code using the Issuer Server's private encryption key RSPrivK.

The Issuer Server 140 may then generate an encrypted session message by encrypting the signed session token (and the signed server pseudo-random code, if generated) with the User Public Certificate UPubC that was registered with the issuer Server 140 (in association with the token identifier) during the Registration Process. Preferably, the Issuer Server 140 embeds the encrypted data and the Issuer Server's Public Certificate RSPubC in a browser cookie, and sends the cookie to the browser 400, at step S710.

The Network Client 345 forwards the encrypted data and the Issuer Server's Public Certificate RSPubC to the Token Manager 100. Upon receipt, the Token Manager 100 queries the Form Factor Details store 329 with the token identifier that was read from the hardware token 110 for the User Public Certificate UPubC that was registered with the Issuer Server 140.

The Token Manager 100 decrypts the session message using the User Public Certificate UPubC, and then verifies that the Issuer Server's Public Certificate RSPubC was signed by the Root Certificate Authority. If verified, the Token Manager 100 validates the signed session token using the Issuer Server's Public Certificate RSPubC.

If the session message included a signed server pseudo-random code, the signed server pseudo-random code may be validated using the Issuer Server's Public Certificate RSPubC. The server pseudo-random code itself may be validated by comparing the server pseudo-random code against an expected value for the pseudo-random code. If me Token Manager 100 is implemented as a self-contained plug-in peripheral or a self-contained contactless device where the functionality of the hardware token 110 is embedded in the Token Manager 100, the server pseudo-random code may be validated by a suitable application on the Token Manager 100, such as the One-Time-Password application. Alternately, if the Token Manager 100 is implemented as a plug-in peripheral or as an internal device to the Computer Host 120, configured to interface with a hardware token 110, and the hardware token 110 includes a Chip Authentication Program application, the server pseudo-random code may be validated by the hardware token 110.

The Token Manager 100 or the Network Client 345 may generate a credential from the User Public Certificate UPubC. The credential includes the session token. The credential may be implemented as a digital Session Certificate SCert. Optionally, the Token Manager 100 may also generate a pseudo-random code, such as a One-Time-Password (OTP), using a suitable application on the Token Manager 100, such as the One-Time-Password application, and incorporate the pseudo-random code into the Session Certificate SCert.

The Token Manager 100 or the Network Client 345 then signs the Session Certificate SCert with the User private key UPrivK. As discussed above, since the Session Certificate SCert is derived from the User Public Certificate UPubC, the Session Certificate SCert is a "child" certificate of the User Public Certificate UPubC, and the User Public Certificate UPubC is a "parent" certificate of the Session Certificate SCert.

Since the Session Certificate SCert includes the session token that was received from the Issuer Server 140, the credential is uniquely associated with the Issuer Server 140, in the sense that no other Session Certificate SCert signed with the User private key UPrivK would have this session token. Moreover, since the Session Certificate SCert is signed with the User private key UPrivK, the credential is uniquely associated with the Token Manager 100 in the sense that no other Token Manager 100 could have generated this Session Certificate SCert. Therefore, the credential is uniquely associated with both the Token Manager 100 and the Issuer Server 140.

Alternately, instead of implementing the credential as a digital certificate, the Token Manager 100 may implement the credential as a signed pseudo-random code, comprising the session token. Optionally, the Token Manager 100 may also generate a pseudo-random code, such as a One-Time-Password (OTP), using a suitable application on the Token Manager 100, such as the One-Time-Password application, and incorporate the pseudo-random code into the credential. The Token Manager 100 or the Network Client 345 may sign the session token and optionally the pseudo-random code with the User private key UPrivK. Since the credential is signed with the User private key UPrivK, the credential is uniquely associated with the Token Manager 100 in the sense that no other Token Manager 100 could have generated this credential.

The Network Client 345 then uses the browser 400 to transmit the credential and the User Public Certificate UPubC to the Issuer Server 140, at step S712.

The Issuer Server 140 then establishes a new communication session with the browser 400. Preferably, the browser 400 and the Issuer Server 140 establish an encrypted session, using the Issuer Server's Public Certificate RSPubC, in the conventional manner. More preferably, the browser 400 and the Issuer Server 140 establish a mutually-authenticated encrypted TLS session. If the credential comprised the Session Certificate SCert, preferably the browser 400 and the Issuer Server 140 establish the mutually authenticated TLS session using the Session Certificate SCert and the Issuer Server's Public Certificate RSPubC. If the credential comprised the pseudo-random code instead of the Session Certificate SCert, the Network Client 345 may provide the Issuer Server 140 with a public certificate of the Token Manager 100, such as the User Certificate UPubC, to facilitate establishment of the mutually authenticated session. Alternately, the Token Manager 100 and the Issuer Server 140 may establish an encrypted session using a GlobalPlatform Secure Channel Protocol (SCP) session, to thereby encrypt communications between the Token Manager 100 and the Issuer Server 140.

After the communications session between the Issuer Server 140 and the browser 400 has been established, the Network Client 343 uses the browser 400 to transmit the transaction code and the User Public Certificate UPubC to the Issuer Server 140, via the communications session, at step S714.

The Issuer Server 140 may then verify that the User Public Certificate UPubC that was transmitted with the credential was signed by the Root Certificate Authority, and may validate the credential using the User Public Certificate UPubC. If the credential included a pseudo-random code (whether transmitted as part of the Session Certificate SCert, or without any Session Certificate SCert), the Issuer Server 140 may also validate the credential by comparing the pseudo-random code against an expected value for the pseudo-random code. If the credential is so validated, the credential was generated from the User Public Certificate UPubC and is uniquely associated with the Token Manager 100.

The Issuer Server 140 may also verify that the session token included in the credential matches the session token transmitted by the Issuer Server 140, thereby verifying that the credential is uniquely associated with the Token Manager 100 and the Issuer Server 140, and that the Token Manager 100 was interfaced with the Computer Host 120 at step S702.

If the Token Manager 100 is configured to validate the hardware token 110 from the token identifier, the Issuer Server 140 is assured that the hardware token 110 was interfaced with the Token Manager 100 at step S702, and the transaction code was generated by the hardware token 110. However, if the Token Manager 100 did not validate the hardware token 110, the Issuer Server 140 may validate the transaction code, to thereby verify that the hardware token 110 was interfaced with the Token Manager 100 at step S702. Preferably, the Issuer Server 140 validates the transaction code by verifying that the transaction code was generated by the hardware token 110. For example, if the Issuer Server 140 transmitted the non-predictable data to the hardware token 110 for generation of the transaction code, the Issuer Server 140 may validate the transaction code by comparing the received transaction code against a value expected based on the non-predictable data. If the Issuer Server 140 is assured that the transaction code was generated by the hardware token 110, the Issuer Server 140 saves the credential in its database, together with the transaction code and the User Public Certificate UPubC.

After the user has completed inputting the requested user identification information into the Relying Party web page, at step S716 the user transmits the web page to the Relying Party Server 135, requesting authorization for delivery of the online services of the Relying Party (a "transaction request"). At step S718, the Relying Party Server 135 forwards the transaction request (including the transaction pointer) to the Issuer Server 140, via the communications network 130. If the transaction pointer is in the form of a payment or credit card number, the Relying Party Server 135 may transmit the transaction pointer to an Acquirer Server (not shown), which extracts the SIIN from the transaction pointer, and forwards the transaction request to the Issuer Server 140 identified by the SIIN. As will be apparent, the Issuer Server 140 receives the transaction pointer via a communications channel that is distinct from the communications channel that was established between the browser 400 and the Issuer Server 140.

The Issuer Server 140 then attempts to correlate the transaction pointer with a transaction code. Since the credential is typically transmitted to the Issuer Server 140 (at step S712) very shortly after the user interfaces the hardware token 110 with the Token Manager 100, typically the Issuer Server 140 receives the credential and the transaction code from the Network Client 135 in advance of the Issuer Server 140 receiving the transaction pointer from the Relying Party Server 135. Therefore, the Issuer Server 140 attempts to correlate the transaction pointer with a transaction code by querying its database with the transaction pointer for a credential that is currently associated with a corresponding transaction code. If the query returns a credential having an associated transaction code drat matches the transaction pointer, the correlation attempt was successful. The Issuer Server 140 may also verify that the User Public Certificate UPubC associated with the credential (if located) was signed by the Root Certificate Authority, and validate the located credential using the User Public Certificate UPubC.

If the hardware token 110 is implemented as a payment card or a credit card, the Issuer Server 140 may receive the transaction request indirectly from the Relying party Server 135. In this variation, if the Issuer Server 140 is able to validate the credential, the Issuer Server 140 may use the User Public Certificate UPubC to retrieve the user's payment card number or credit card number, and execute its standard authorization rules against the retrieved payment or credit card number for processing of the transaction request.

After the transaction pointer has been successfully correlated with a transaction code, the Issuer Server 140 generates an authorization signal indicating that the user is authorized to receive online services from the Relying Party Server 135. The Issuer Server 140 forwards the authorization signal to the Relying Party Server 135, via the communications network 130, at step S720. If the Issuer Server 140 received the web page information via the Acquirer Server, the Issuer Server 140 transmits the authorization signal to the Acquirer Server (not shown), which forwards the authorization signal to the Relying Party Server 135.

Upon acknowledgement of the authorization signal from the Relying Party Server 135, the Issuer Server 140 deletes the association between the transaction code, the credential and the User Public Certificate UPubC, and invalidates the session token. At step S722, the Relying Party Server 135 may transmit an authorization message to the Computer Host 120 for display to the user, indicating whether the transaction request was authorized. The Relying Party Server 135 then provides its online services to the user, in accordance with the authorization signal.

If the user concurrently accesses multiple Relying Party Servers 135, the Token Manage 100 will only generate a single credential for all of the concurrent sessions. Therefore, the credential will include the session token from each Issuer Server 140. When the user disconnects from a Relying Party Server 135, the Token Manager 100 will generate a new credential which will only include the session tokens that are associated with the remaining active sessions.

In another variation, instead of the Issuer Server 140 validating the transaction code, and attempting to correlate the transaction pointer with a transaction code, the functionality of the Issuer Server 140 may be split amongst a plurality of computer servers. For example, the Issuer Server 140 may validate the transaction code, and use another computer server to correlate the transaction pointer with a transaction code. In this variation, the Issuer Server 140 would generate the authorization signal after receiving an indication of validity of the correlation between the transaction pointer and the transaction code. Conversely, the Issuer Server 140 may attempt to correlate the transaction pointer with a transaction code, and use another computer server to validate the transaction code.

In another variation, the Issuer Server 140 generates the transaction pointer, associates the transaction pointer with the received transaction code, and transmits the transaction pointer to the Network Client 345. The Network Client 345 pushes the transaction pointer into the hardware token, identifier field of the web page of the Relying Party Server 135, and then sends the transaction request page to the Relying Party Server 135, at step S716.

In yet another variation, the hardware token 110 has not been registered for use in association with a Token Manager 100. Therefore, the Issuer Server 140 does not maintain an association between the user's User Public Certificate UPubC, hardware token number and the token identifier of the hardware token 110. Instead, the hardware token 110 is configured with its own digital public certificate, and the Issuer Server 140 maintains an association between the digital public certificate of the hardware token 110, and the hardware token number and the token identifier of the hardware token 110. In this variation, the hardware token 110 generates the credential from the session token and the digital public certificate of the hardware token 110. After the Issuer Server 140 locates the credential, the Issuer Server 140 validates the credential using the digital public certificate of the hardware token 110, and then sends the authorization signal to the Relying Party Server 135 as described above.

Token Manager Authentication Process (Embodiment #2)

Figure 8:
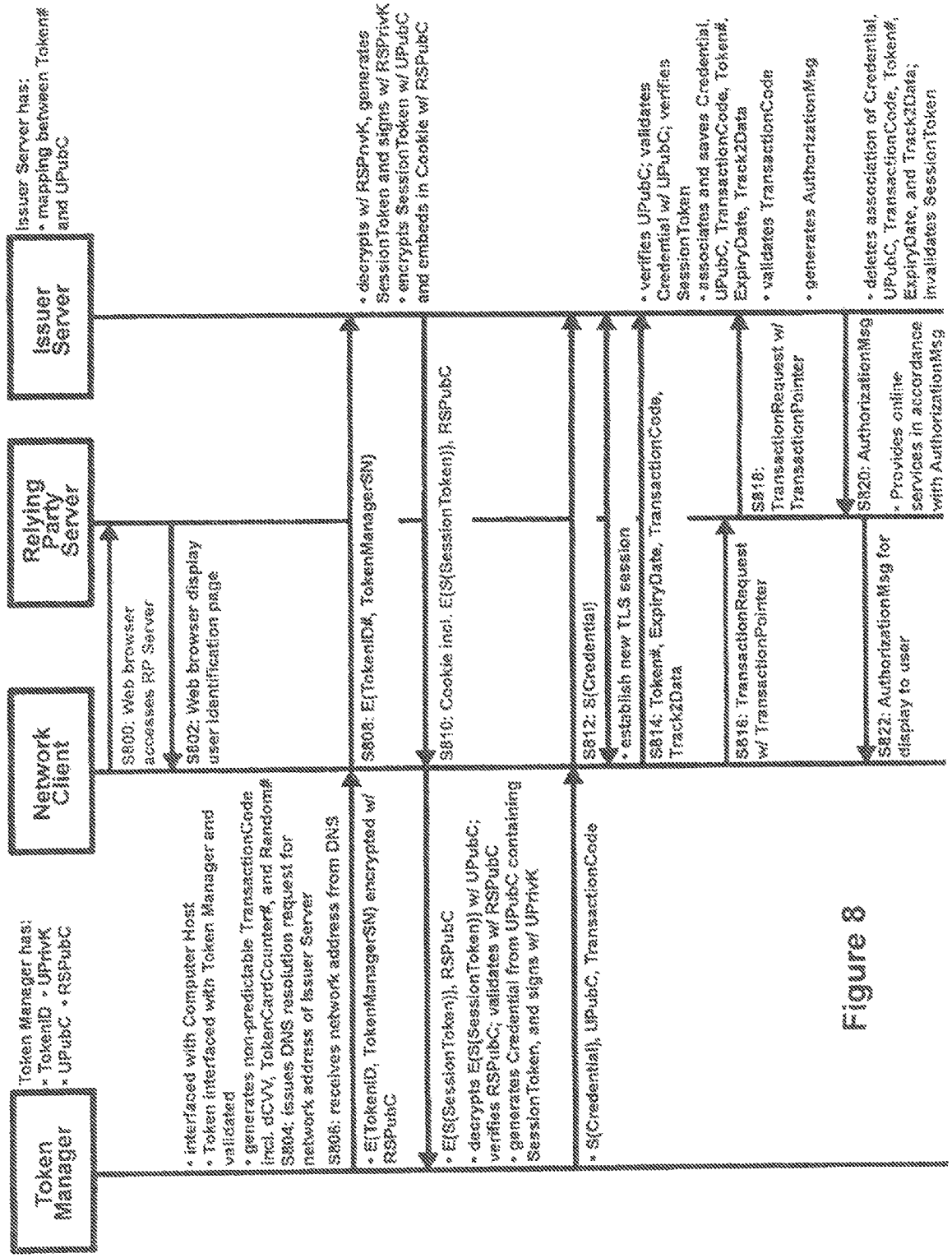
FIG. 8 is a message flow diagram that depicts the transmission of messages during a second embodiment of the Authentication process implemented by the Token Manager.

The second embodiment of the Authentication process will now be described with reference to FIG. 8. As in the first embodiment, the Issuer Server 140 maintains an association between each user's User Public Certificate UPubC, hardware token number and the token identifier of the hardware token 110 (provided or trusted by the Issuer associated with the Issuer Server 140).

Further, as in the first embodiment, prior to authorizing the user the Token Manager 100 transmits a transaction code to the Issuer Server 140, over a first communications channel. Preferably, the transaction code is unpredictable by the Issuer Server 140. When the user wishes to receive online services from the Relying Party Server 135, the Network Client 345 provides the Relying Party Server 135 with a transaction request that includes a transaction pointer. Via a second communications channel that is distinct from the first communications channel, the Relying Party Server 135 transmits the transaction request to the Issuer Server 140. Preferably, the transaction pointer is unpredictable by the Issuer Server 140.

However, in contrast to the first embodiment, the transaction code includes the transaction pointer. The Network Client 345 may transmit the transaction pointer to the Relying Party 135 in a Card Verification Value (CVV) field of the web page hosted by the Relying Party Server 135. As in the first embodiment, the Issuer Server 140 transmits the authorization signal to the Relying Party Server 135 based on the correlation between the transaction code and the transaction pointer.

The second embodiment of the Authentication process is initiated, at step S800 when the user starts a new session of the web browser 400 and accesses the Relying Party Server 135 (typically over a server side SSL/TLS encrypted communication channel). The user then attempts to receive online services from the Relying Party Server 135 (e.g. access secure online accounts or databases, securely download or upload files from/to the Relying Party Server), for example by selecting an appropriate link on the website hosted by the Relying Party Server 135. In response, at step S802 the Relying Party website causes the Computer Host 120 to display a web page prompting the user to provide user identification information (such as the user's first name, last name and address) and the token number of the user's hardware token 110 and the associated Card Verification Value (CVV), and to interface the user's hardware token 110 with the Token Manager 100. If the Relying Party requires payment for the online services, the web page may also specify a required payment amount.

The user interfaces the Token Manager 100 to the Computer Host 120 and interfaces their hardware token 110 with the Token Manager 100 (unless the Token Manager 100 is implemented as a self-contained plug-in peripheral or a self-contained contactless device where the functionality of the hardware token 110 is embedded in the Token Manager 100).

After the hardware token 110 is physically interfaced with the Token Manager 100, the Token Manager 100 reads from the hardware token 110 the token identifier of the hardware token 110, and (if stored thereon) the user's first name, last name, hardware token number, expiry date, Track 2 discretionary data, and internal card counter number.

The Token Manager 100 or the Network Client 345 may also validate the hardware token 110. To do so, the Token Manager 100 or the Network Client 345 may determine whether the token identifier read from the hardware token 110 matches any one of the token identifiers that were stored on the Token Manager 100 during the Registration process. As discussed above, typically the token identifier is uniquely associated with the Token Manager 100. However, alternately the token identifier may identify a group or class type of authenticator.

If the token identifier reveals that that the hardware token 110 is not valid (i.e. the hardware token 110 is not associated with the Token Manager 100), an error is raised and the Authentication process ends. However, if the token identifier reveals that the hardware token 110 is valid, the hardware token 110 may dynamically generates a transaction code that is not predictable by the Issuer Server 140, and pass the transaction code to the Token Manager 100.

The transaction code may be generated by the Token Manager 110. Use hardware token 110 may dynamically generate the transaction code upon interfacing the hardware token 100 with the Token Manager 100. Preferably, the Issuer Server 140 or the Token Manager 100 generates non-predictable data, and the hardware token 110 generates the transaction code from the non-predictable data as received from the Issuer Server 140 (via the first communications channel) or the Token Manager.

The transaction code may comprise a compound data element. For example, if the hardware token 110 is configured as an EMV payment card, the transaction code may comprise a cryptogram, for example, that is dynamically-generated from data originating, from the hardware token 110. To compute the transaction code, the Token Manager 100 or the Issuer Server 140 may send a random number to the hardware token 110, and the hardware token 110 may generate a cryptogram from the random number, an internal card counter number and a diversified key, such as a triple-DES (Data Encryption Standard) key, of the hardware token 110. The hardware token 110 may then send the transaction code (comprising the cryptogram, internal card counter number, and random number) to the Token Manager 100.

As in the first embodiment, the Token Manager 100 or the Network Client 345 may then generate a transaction pointer from the transaction code. Further, preferably, the transaction pointer is not predictable by the Issuer Server 140. However, in contrast to the first embodiment the transaction pointer may be a component of the transaction code. For instance, in the foregoing example, the transaction pointer may comprise the cryptogram. As will be apparent, in this variation, the transaction code includes the transaction pointer.

Alternately, instead of the Token Manager or Network Client 345 generating the transaction pointer, the hardware token 110 may generate the transaction pointer. For example, if the hardware token 110 is configured as a magnetic stripe card, the transaction pointer may comprise a dynamic Card Verification Value (dCVV) that is dynamically-generated from data originating from the hardware token 110. To compute the dynamic Card Verification Value (dCVV), the Token Manager 100 or the Issuer Server 140 may send a random number to the hardware token 110, and the hardware token 110 may generate the dCVV from the random number, and an internal card counter number of the hardware token 110. The hardware token 110 may then send the transaction pointer (dCVV) to the Token Manager 100, either as part of the hardware token's Track 2 discretionary data, or independently of any Track 2 discretionary data. The Token Manager 100 may then generate the transaction code front the transaction pointer. For instance, in the foregoing example, the transaction code may comprise the combination of the dCVV, internal card counter number, and random number.

The Token Manager 100 may then interface with the Network Client 345 to push the transaction pointer into the Card Verification Value (CVV) field of the web page of the Relying Party Server 135.

Preferably the Network Client 345 is configured with programmatic logic that is based on standard "form filler" technology that automatically enters the first name, last name, hardware token number and expiry date information, that was read from the hardware token 110, into the appropriate fields of the Relying Party web page. Preferably, the programmatic logic also enters the transaction pointer dCVV in the Card Verification Value (CVV) field of the Relying Party web page.

At step S804, the Token Manager 100 issues a DNS resolution request to an appropriate DNS requesting the network address of the Issuer Server 140 associated with the SIIN. The DNS responds to the Token Manager 100 with the resolved network address, at step S806.

At step S808, the Token Manager 100 generates a session token request message that includes the token identifier of the hardware token 110 (and/or the Serial Number 321 of the Token Manager 100), and encrypts the session token request message with the Issuer Server's public certificate RSPubC. The Token Manager 100 transmits the session token request message to the Issuer Server 140 at the network address specified by the DNS. The Issuer Server 140 decrypts the session token request message with the Issuer Server's private key RSPrivK, generates a session token, such as a random session number, and may sign the session token with the Issuer Server's private key RSPrivK. Optionally, the Issuer Server 140 may also generate a pseudo-random code, such as a Server One-Time-Password (SOTP) using the One-Time-Password application 516, and sign the server pseudo-random code using the Issuer Server's private encryption key RSPrivK.

The Issuer Server 140 may then generate an encrypted session message by encrypting the signed session token (and the signed server pseudo-random code, if generated) with the User Public Certificate UPubC that was registered with the issuer Server 140 (in association with the token identifier) during the Registration Process. Preferably, the Issuer Server 140 embeds the encrypted data and the Issuer Server's Public Certificate RSPubC in a browser cookie, and sends the cookie to the browser 400, at step S810.

The Network Client 345 forwards the encrypted data and the Issuer Server's Public Certificate RSPubC to the Token Manager 100. Upon receipt, the Token Manager 100 queries the Form Factor Details store 329 with the token identifier that was read from the hardware token 110 for the User Public Certificate UPubC that was registered with the Issuer Server 140.

The Token Manager 100 decrypts the session message using the User Public Certificate UPubC, and then verifies that the Issuer Server's Public Certificate RSPubC was signed by the Root Certificate Authority. If verified, the Token Manager 100 validates the signed session token using the Issuer Server's Public Certificate RSPubC.

If the session message included a signed server pseudo-random code, the signed server pseudo-random code may be validated using the Issuer Server's Public Certificate RSPubC. The server pseudo-random code itself may be validated by comparing the server pseudo-random code against an expected value for the pseudo-random code. If the Token Manager 100 is implemented as a self-contained plug-in peripheral or a self-contained contactless device where the functionality of the hardware token 110 is embedded in the Token Manager 100, the server pseudo-random code may be validated by a suitable application on the Token Manager 100, such as the One-Time-Password application. Alternately, if the Token Manager 100 is implemented as a plug-in peripheral or as an internal device to the Computer Host 120, configured to interface with a hardware token 110, and the hardware token 110 includes a Chip Authentication Program application, the server pseudo-random code may be validated by the hardware token 110.

The Token Manager 100 or the Network Client 345 may generate a credential from the User Public Certificate UPubC. The credential includes the session token, and may be implemented as a digital Session Certificate SCert. Optionally, the Token Manager 100 may also generate a pseudo-random code, such as a One-Time-Password (OTP), using a suitable application on the Token Manager 100, such as the One-Time-Password application, and incorporate the pseudo-random code into the Session Certificate SCert.

The Token Manager 100 or the Network Client 345 then signs the Session Certificate SCert with the User private key UPrivK. As discussed above, since the Session Certificate SCert is derived from the User Public Certificate UPubC, the Session Certificate SCert is a "child" certificate of the User Public Certificate UPubC, and the User Public Certificate UPubC is a "parent" certificate of the Session Certificate SCert.

Since the Session Certificate SCert includes the session token that was received from the Issuer Server 140, the credential is uniquely associated with the Issuer Server 140, in the sense that no other Session Certificate SCert signed with the User private key UPrivK would have this session token. Moreover, since the Session Certificate SCert is signed with the User private key UPrivK, the credential is uniquely associated with the Token Manager 100 in the sense that no other Token Manager 100 could have generated this Session Certificate SCert. Therefore, the credential is uniquely associated with both the Token Manager 100 and the Issuer Server 140.

Alternately, instead of implementing the credential as a digital certificate, the Token Manager 100 may implement the credential as a signed pseudo-random code, comprising the session token. Optionally, the Token Manager 100 may also generate a pseudo-random code, such as a One-Time-Password (OTP), using a suitable application on the Token Manager 100, such as the One-Time-Password application, and incorporate the pseudo-random code into the credential. The Token Manager 100 or the Network Client 345 may sign the session token (and optionally the pseudo-random code) with the User private key UPrivK. Since the credential is signed with the User private key UPrivK, the credential is uniquely associated with the Token Manager 100 in the sense that no other Token Manager 100 could have generated this credential.

The Network Client 345 then uses the browser 400 to transmit the credential and the User Public Certificate UPubC to the Issuer Server 140, at step S812.

The Issuer Server 140 then establishes a new communication session with the browser 400. Preferably, the browser 400 and the Issuer Server 140 establish an encrypted session, using the Issuer Server's Public Certificate RSPubC, in the conventional manner. More preferably, the browser 400 and the Issuer Server 140 establish a mutually-authenticated encrypted TLS session. If the credential comprised the Session Certificate SCert, preferably the browser 400 and the Issuer Server 140 establish the mutually authenticated TLS session using the Session Certificate SCert and the Issuer Server's Public Certificate RSPubC. If the credential comprised the pseudo-random code instead of the Session Certificate SCert, the Network Client 345 may provide the Issuer Server 140 with a public certificate of the Token Manager 100, such as the User Certificate UPubC, to facilitate establishment of the mutually authenticated session. Alternately, the Token Manager 100 and the Issuer Server 140 may establish an encrypted session using a GlobalPlatform Secure Channel Protocol (SCP) session, to thereby encrypt communications between the Token Manager 100 and the Issuer Server 140.

After the communication session between the Issuer Server 140 and the browser 400 has been established, the Network Client 345 uses the browser 400 to transmit the hardware token number and expiry date, the transaction code, the random number generated by the Token Manager 100, the internal card counter number of the hardware token 110, and the User Public Certificate UPubC to the Issuer Server 140, over the communication session, at step S814.

The Issuer Server 140 then verifies that the User Public Certificate UPubC associated with the credential was signed by the Root Certificate Authority, and validates the credential using the User Public Certificate UPubC. If the credential included a pseudo-random code (whether transmitted as part of the Session Certificate SCert, or without any Session Certificate SCert), the Issuer Server 140 may also validate the credential by comparing the pseudo-random code against an expected value for the pseudo-random code. If the credential is so validated, the credential was generated from the User Public Certificate UPubC and is uniquely associated with the Token Manager 100.

The Issuer Server 140 may also verify that the session token included in the credential matches the session token transmitted by the Issuer Server 140, thereby verifying that the credential is uniquely associated with the Token Manager 100 and the Issuer Server 140.

If the credential is validated, the Issuer Server 140 computes a hash of the transaction code, hardware token number and expiry date information, and saves the transaction code, the random number generated by the Token Manager 100, aid the internal card counter number of the hardware token 110 in the Issuer Server database, in association with the computed hash.

After the first name, last name, hardware token number, expiry date and transaction pointer have been input into the Relying Party web page, at step S816 the user transmits the web page to the Relying Party Server 135, requesting authorization for delivery of the online services of the Relying Party ("a transaction request"). At step S818, the Relying Party Server 135 forwards the transaction request to the Issuer Server 140, via an Acquirer Server, over the communications network 130. As will be apparent, the Issuer Server 140 receives the transaction pointer via a communications channel that it distinct from the communications channel that was established between the browser 400 and the Issuer Server 140.

The Issuer Server 140 then attempts to correlate the transaction pointer with a transaction code. Preferably, the Issuer Server 140 attempts to correlate the transaction pointer with a transaction code by validating the transaction code received from the Token Manager 100 using the transaction pointer received from the Relying Party Server 140, thereby also verifying that the hardware token 110 was interfaced with the Token Manager 100 at step S802 when the transaction code was transmitted to the Issuer Server 140.

Since the credential is typically transmitted to the Issuer Server 140 (at step S812) very shortly after the user interfaces the hardware token 110 with the Token Manager 100, typically the Issuer Server 140 receives the credential and transaction code in advance of the Issuer Server 140 receiving the transaction pointer from the Relying Party Server 135. Therefore, the Issuer Server 140 validates the transaction code with the transaction pointer by (i) computing a hash of the transaction pointer, hardware token number and expiry date information (as received from the Relying Party Server 135), (ii) querying its database with the hash value for the associated transaction code, Token Manager random number, and hardware token internal card counter number, (iii) computing a Dynamic Card Validation Value from the Token Manager random number, and hardware token internal card counter number retrieved by the database query, and (iv) comparing the Dynamic Card Validation Value against the transaction code retrieved as part of the database query.

If the retrieved transaction code matches the computed Dynamic Card Validation Value, the correlation was successful, and the Issuer Server 140 has verified that the hardware token 110 must be have been interfaced with the Token Manager 100 at step S802 when the transaction code was transmitted to the Issuer Server 140. If the hardware token 110 is implemented as a payment card or a credit card, the Issuer Server 140 may then execute its standard authorization rules against the payment or credit card number for processing of the transaction request.

After the transaction pointer has been successfully correlated with a transaction code, the Issuer Server 140 generates an authorization message indicating that the user is authorized to receive online services from the Relying Party Server 135. The Issuer Server 140 forwards the authorization message to the Relying Party Server 135, via the communications network 130, at step S820. If the Issuer Server 140 received the web page information via the Acquirer Server, the Issuer Server 140 transmits the authorization message to the Acquirer Server (not shown), which forwards the authorization message to the Relying Party Server 135.

Upon acknowledgement of the authorization signal from the Relying Patty Server 135, the Issuer Server 140 deletes the association between the database entry for the transaction code, and invalidates the session token. At step S822, the Relying Party Server 135 may transmit the authorization message to the Computer Host 120 for display to the user. The Relying Party Server 135 then provides its online services to the user in accordance with the authorization message.

In one variation, the credential includes the token identifier of the hardware token 110, and the credential is transmitted to the Issuer Server 140, at step S814, without the hardware token number and expiry date. After validating tire credential, the Issuer Server 140 queries its database with the token identifier of the hardware token 110 for the associated hardware token number and expiry date information, and saves the located hardware token number and expiry date information in its database, together with the transaction code, Token Manager random number, and hardware token internal card counter number, as described above.

In another variation, the Issuer Server 140 generates a transaction code having the format of a payment or credit card number. For example, the transaction code may have the format: SIIN+non-predictable series of characters+ SDCS, where the SIIN is used to route authorization requests from Relying Party Servers 135 to the correct Issuer Server 140, and SDCS is a single digit check sum that is calculated preferably using the Luhn algorithm. The Issuer Server 140 maintains an association between the user's actual hardware token number and the transaction code, and sends the transaction code to the Network Client 345 for insertion (as a transaction pointer) into the hardware token identifier field of the web page of the Relying Party Server 135 (instead of the actual hardware token number). After receipt of the transaction request at step S818, the Issuer Server 140 queries its database with the transaction pointer for the actual hardware token number, and associated transaction code Token Manager random number, and hardware token internal card counter number, and then validates the transaction pointer as described above.

Token Manager Authentication Process (Embodiment #3)

Figure 9:
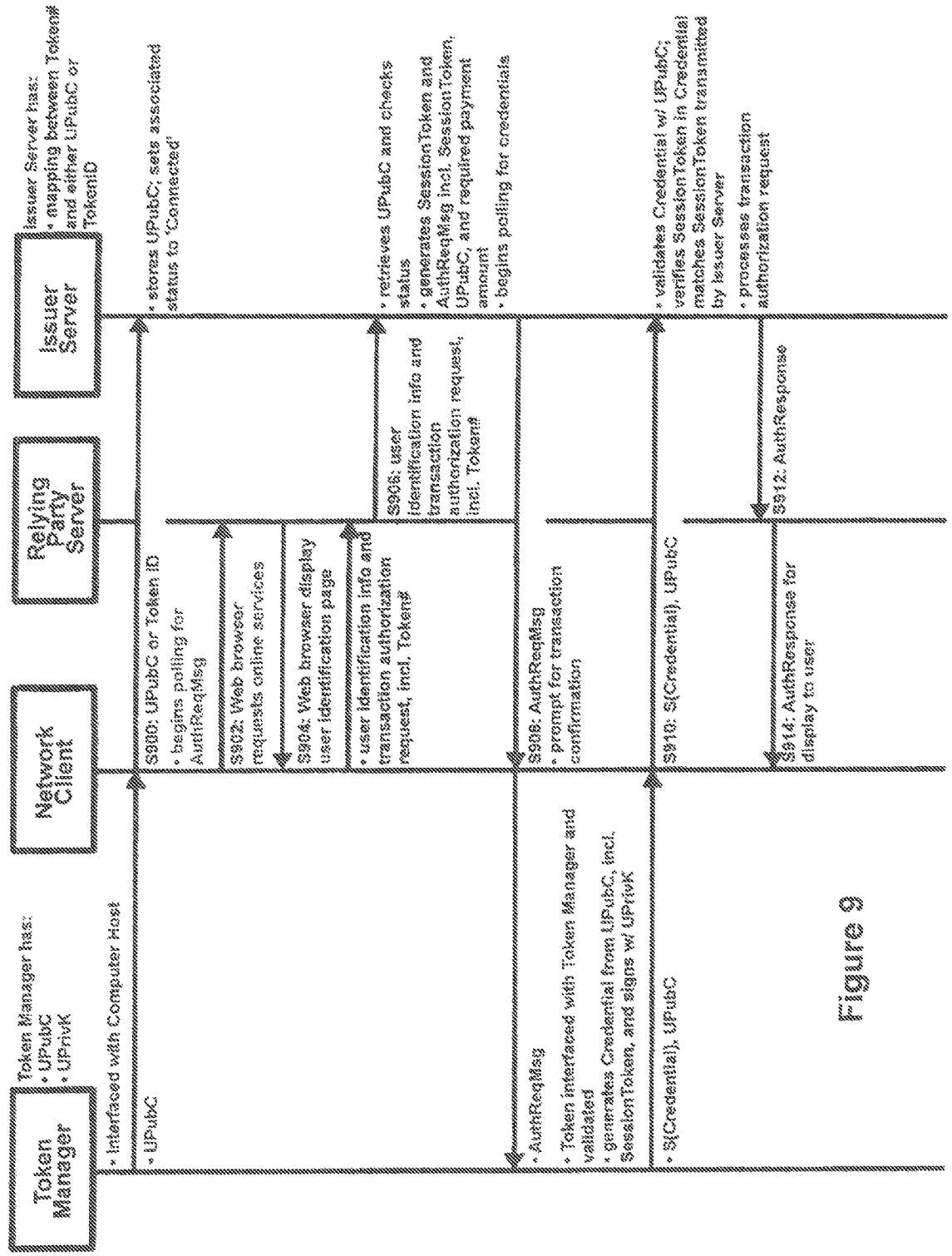
FIG. 9 is a message flow diagram that depicts the transmission of messages during a third embodiment of the Authentication process implemented by the Token Manager.

The third embodiment of the Authentication process will now be described with reference to FIG. 9. In this embodiment, the Issuer Server 140 maintains an association between each user's User Public Certificate UPubC (or Token Manager Serial Number 321), hardware token number and the token identifier of the hardware token 110 (provided or trusted by the Issuer associated with the Issuer Server 140). After the user accesses a Relying Party Server 135 using the Host Computing Device 120, the Issuer Server 140 may authorize the user (via the Token Manager 100 and the Computer Host 130) to receive online services from the Relying Party Server 135.

However, in contrast to the first embodiment, prior to authorizing the user, the Token Manager 100 or the Network Client 345 transmits a credential to the Issuer Server 140, over a first communications channel. When the user wishes to receive online services from the Relying Party Server 135, the Network Client 345 provides the Relying Party Server 135 with a transaction request (for the online services). Via a second communications channel that is distinct from the first communications channel, the Relying Party Server 135 transmits the transaction request to the Issuer Server 140 for authorization of the transaction request.

Preferably, the Issuer Server 140 receives the transaction request prior to receiving the credential.

The Issuer Server transmits the authorization signal to the Relying Party Server 135, in response to the transaction request, based on a determination of validity of the credential and data originating from the hardware token 110.

The third embodiment of the Authentication process is initiated when the user interfaces the Token Manager 100 to the Computer Host 120. In response, at step S900, the Token Manager 100 or the Network Client 345 transmits a transaction code to the Issuer Server 140. As in the previous embodiments, preferably the transaction code is not predictable by the Issuer Server 140. However, in contrast to the previous embodiments, the transaction code may comprise the user's User Public Certificate UPubC (or the Serial Number 321 of the Token Manager 100) to the Issuer Server 140, thereby indicating that the user has interfaced the Token Manager 100 with the Computer Host 120. The Issuer Server 140 stores the User Public Certificate UPubC (or Serial Number 321) in its database, and sets an associated status flag to 'Connected'.

The Network Client 345 then begins polling the Issuer Server 140 for authentication request messages and authentication request cancellation messages (discussed below).

At step S902, the user starts a new session of the web browser 400 and accesses the Relying Party Server 135 (typically over a server side SSL/TLS encrypted communication channel). The user then attempts to receive online services from the Relying Party Server 135 (e.g. access secure online accounts or databases, securely download or upload files from/to the Relying Party Server), for example by selecting an appropriate link on the website hosted by the Relying Party Server 135. In response, at step S904 the Relying Party Server 135 causes the Computer Host 120 to display a web page prompting the user to provide user identification information (such as the user's first name, last name and address) and hardware token number and associated Card Verification Value (CVV). If the Relying Party requires payment for the online services, the web page may also specify a required payment amount. As will become apparent, in this embodiment the hardware token number may have the format of a payment or credit card number, and acts as the transaction pointer.

After the requested information has been input into the Relying Party web page, the user submits the web page to the Relying Party Server 135, together with the transaction pointer, requesting authorization for the transaction for delivery of the online services ("Transaction request"). At step S906, the Relying Party Server 135 forwards the transaction request to the Issuer Server 140, via an Acquirer Server, over the communications network 130. As will be apparent, the Issuer Server 140 receives the transaction pointer via a communications channel that is distinct from the communications channel that was established between the browser 400 and the Issuer Server 140.

The Issuer Server 140 determines from the transaction pointer (hardware token number) whether the hardware token 110 is currently registered (via the Registration process) for use in association with a Token Manager 100. If the hardware token 110 is currently registered, the Issuer Server 140 then attempts to correlate the transaction pointer with a transaction code by querying its database with the transaction pointer for the User Public Certificate UPubC (or Token Manager Serial Number 321) a corresponding transaction code (i.e. a User Public Certificate UPubC (or Token Manager Serial Number 321) having an associated status flag of "Connected").

If the Issuer Server 140 is unable to locate a corresponding transaction code (i.e. the status flag for each of the Token Manager 100 is set to 'Not Connected'), the Issuer Server 140 may execute its standard transaction authorization rules against the hardware token number for processing of the transaction authorization request.

However, if the Issuer Server 140 is able to locate a corresponding transaction code (i.e. the status flag for the Token Manager 100 was set to 'Connected' at step S900), the Issuer Server 140 generates a session token, such as a random session number, then generates an authentication request message that includes the session token, the User Public Certificate UPubC (or Token Manager Serial Number 321) and the required payment amount (if any). If the hardware token 110 is currently registered for use in association with multiple Token Managers 100, the Issuer Server 140 generates an authentication request message for each Token Manager 100 (whose status flag is set to 'Connected') that is associated with the hardware token number via the User Public Certificate UPubC (or Token Manager Serial Number 321).

The Issuer Server 140 then begins polling for credentials issued in response to authentication request messages (discussed below).

Since the Network Client 345 is polling the Issuer Server 140 for authentication request messages, at step S908 the Network Client 345 receives the authentication request message which causes the Computer Host 120 to displays a pop-up window stating that the user has requested online services from the Relying Party (and may display the required payment amount, if any). The pop-up window also prompts the user to confirm the transaction by interfacing the user's hardware token 110 with the Token Manager 100. If the hardware token 110 is currently registered for use in association with multiple Token Managers 100 (whose status flag is set to 'Connected'), the Computer Host 120 opens a pop-up window for each authentication request message received.

The user interfaces their hardware token 110 with the Token Manager 100 (unless the Token Manager 100 is implemented as a self contained plug-in peripheral or a self-contained contactless device where the functionality of the hardware token 110 is embedded in the Token Manager 100). After the hardware token 110 is interfaced with the Token Manager 100, the Token Manager 100 reads from the hardware token 110 the token identifier of the hardware token 110.

The Token Manager 100 or the Network Client 345 may also validate the hardware token 110. To do so, the Token Manager 100 or the Network Client 345 may determine whether the token identifier read from the hardware token 110 matches any one of the token identifiers that were stored on the Token Manager 100 during the Registration process. As discussed above, typically the token identifier is uniquely associated with the Token Manager 100. However, alternately the token identifier may identify a group or class type of authenticate.

If the token identifier reveals that that the hardware token 110 is not valid (i.e. the hardware token 110 is not associated with the Token Manager 100), an error is raised and the Authentication process ends. However, if the token identifier reveals that the hardware token 110 is valid, the Token Manager 100 or the Network Client 345 may generate a credential from the User Public Certificate UPubC. The User Public Certificate UPubC may have been included with the authentication request messages. Alternately, the Token Manager 100 may retrieve the User Public Certificate UPubC from the User Certificate store 327, using the Token Manager Serial Number 321.

The credential includes the session token, and may be implemented as a digital Session Certificate SCert. The credential may also include the token identifier of tire hardware token 110. Optionally, the Token Manager 100 may also generate a pseudo-random code, such as a One-Time-Password (OTP), using a suitable application on the Token Manager 100, such as the One-Time-Password application, and incorporate the pseudo-random code into the Session Certificate SCert.

The Token Manager 100 or the Network Client 345 then signs the Session Certificate SCert with the User private key UPrivK. As discussed above, since the Session Certificate SCert is derived from the User Public Certificate UPubC, the Session Certificate SCert is a "child" certificate of the User Public Certificate UPubC, and the User Public Certificate UPubC is a "parent" certificate of the Session Certificate SCert.

Since the Session Certificate SCert includes the session token that was received from the Issuer Server 140, the credential is uniquely associated with the Issuer Server 140, in the sense that no other Session Certificate SCert signed with the User private key UPrivK would have this session token. Moreover, since the Session Certificate SCert is signed with the User private key UPrivK, the credential is uniquely associated with the Token Manager 100 in the sense that no other Token Manager 100 could have generated this Session Certificate SCert. Therefore, the credential is uniquely associated with both the Token Manager 100 and the Issuer Server 140.

Alternately, instead of implementing the credential as a digital certificate, the Token Manager 100 may implement the credential as a signed pseudo-random code, comprising the session token. The credential may also include the token identifier of the hardware token 110. Optionally, the Token Manager 100 may also generate a One-Time-Password (OTP), using a suitable application on the Token Manager 100, such as the One-Time-Password application, and incorporate the OTP into the credential. The Token Manager 100 or the Network Client 345 may sign the pseudo-random code with the User private key UPrivK. Since the credential is signed with the User private key UPrivK, the credential is uniquely associated with the Token Manager 100 in the sense that no other Token Manager 100 could have generated this credential.

The Network Client 345 then uses the browser 400 to transmit the credential and the User Public Certificate UPubC to the Issuer Server 140. Since the Issuer Server 140 is polling for credentials, the Issuer Server 140 receives the credential, at step S910.

The Issuer Server 140 validates the credential by verifying that the User Public Certificate UPubC was signed by the Root Certificate Authority and, if verified, validates the credential using the User Public Certificate UPubC.

If the credential includes the token identifier read from the hardware token 110, the Issuer Server 140 may also validate the hardware token 110 and thereby verify that the hardware token 110 was interfaced with the Token Manager 100 at step S908. To do so, the Issuer Server 140 may determine whether the token identifier included in the credential matches any one of the token identifiers that were stored on the Issuer Server 140 during the Registration process, in association with the User Public Certificate UPubC. As discussed above, typically the token identifier is uniquely associated with the Token Manager 100. However, alternately the token identifier may identify a group or class type of authenticator.

The Issuer Server 140 may also verify that the session token included in the credential matches the session token transmitted by the Issuer Server 140, thereby verifying that the credential is uniquely associated with the Token Manager 100 and the Issuer Server 140, and that the hardware token 130 was interfaced with the Token Manager 100 at step S908.

If the hardware token 110 is currently registered for use in association with multiple Token Managers 100, and the Issuer Server 140 generated an authentication request message for each Token Manager 100 (whose status flag is set to 'Connected'), the Issuer Server 140 validates the first credential received, cancels the remaining authentication request messages, and generates an authentication request cancellation message (discussed below) for the cancelled authentication request messages. Alternately, the Issuer Server 140 may automatically send the authentication request cancellation messages after a specific time period. Since the Network Client 345 is also polling the Issuer Server 140 for authentication request cancellation messages, the Network Client 345 receives the authentication request cancellation messages and closes any open pop-up windows that prompted for the user's hardware token 110.

If the hardware token 110 is implemented as a payment card or a credit card, after the Issuer Server 140 has validated rise credential the Issuer Server 140 may execute its standard authorization rules against the payment or credit card number for processing of the transaction request.

At step S912, the Issuer Server 140 sends an authorization signal to the Relying Party 135. The Relying Party Server 135 then provides its online services to the user, in accordance with the authorization response. At step S914, the Relying Party Server 135 may transmit an authorization message to the Computer Host 120 for display to the user.

In one variation, in response to the authorization request from the Relying Party 135 for the online services, the Issuer Server 140 does not generate an authentication request message. Instead, the Issuer Server 140 executes its standard transaction authorization rules against the hardware token number for processing of the transaction authorization request, and that sends the user a message notifying the user of the transaction. In response, the user uses the Computer Host 120 to navigate to a web page hosted by the Issuer Server 140 which prompts the user to confirm the transaction by interfacing the user's hardware token 110 with the Token Manager 100. The Token Manager 100 then generates a credential which the Issuer Server 140 uses to generate an authentication response, as described above.

The invention claimed is:

1. A method of authenticating a network client to a relying party computer via a computer server, the network client being configured to communicate with the relying party computer and the computer server, the network client being further configured to communicate with a token manager, the token manager being configured to communicate with a hardware token interfaced with the token manager, the method comprising the computer server:
   receiving a transaction code from one of the token manager and the network client via a first communications channel established on a communication network, the first communications channel encrypted to be accessible only by the network client and the computer server;
   receiving a transaction request from the relying party computer via a second communications channel established on the communication network, the second communications channel encrypted to be accessible only by the relying party computer and the computer server and distinct from the first communications channel, wherein the transaction request as received comprises a transaction pointer that is associated with the hardware token;
   correlating the transaction pointer with the transaction code to identify the token manager;
   transmitting an authentication request message to one of the token manager and the network client via the first communications channel;
   receiving a credential from one of the token manager and the network client via the first communications channel; and
   transmitting an authorization signal to the relying party computer in response to the transaction request in accordance with a determination of validity of the credential and data originating from the hardware token, the authorization signal facilitating authentication of the network client to the relying party computer.

2. The method according to claim 1, wherein the computer server receives the transaction request prior to receiving the credential.

3. The method according to claim 1, wherein the determination of validity comprises the computer server comparing the data originating from the hardware token with expected data.

4. The method according to claim 1, wherein the determination of validity comprises the computer server verifying that the credential is associated with the token manager.

5. The method according to claim 1, wherein the determination of validity comprises the computer server verifying that the credential is uniquely associated with the token manager and the computer server.

6. The method according to claim 1, wherein the authentication request message comprises a session token, and the determination of the validity comprises the computer server comparing the transmitted session token with a session token included in the credential.

7. The method according to claim 1, further comprising determining from the transaction pointer whether the hardware token is currently registered for use in association with the token manager.

8. The method according to claim 1, further comprising determining, based on the correlating, whether the token manager has a connected status.

9. A non-transitory computer-readable medium comprising computer processing instructions for execution by a computer server, the computer processing instructions, when executed by the computer server, causing the computer server to perform a method of authenticating a network client to a relying party computer via the computer server, the network client being configured to communicate with the relying party computer and the computer server, the network client being further configured to communicate with a token manager, the token manager being configured to communicate with a hardware token interfaced with the token manager, the method comprising:

receiving a transaction code from one of the token manager and the network client via a first communications channel established on a communication network, the first communications channel encrypted to be accessible only by the network client and the computer server;

receiving a transaction request from the relying party computer via a second communications channel established on the communication network, the second communications channel encrypted to be accessible only by the relying party computer and the computer server and distinct from the first communications channel, wherein the transaction request as received comprises a transaction pointer that identifies the hardware token;

correlating the transaction pointer with the transaction code to identify the token manager;

transmitting an authentication request message to one of the token manager and the network client via the first communications channel;

receiving a credential from one of the token manager and the network client via the first communications channel; and transmitting an authorization signal to the relying party computer in response to the transaction request in accordance with a determination of validity of the credential and data originating from the hardware token, the authorization signal facilitating authentication of the network client to the relying party computer.

10. The computer-readable medium according to claim 9, wherein the computer server receives the transaction request prior to receiving the credential.

11. The computer-readable medium according to claim 9, wherein the determination of validity comprises comparing the data originating from the hardware token with expected data.

12. The computer-readable medium according to claim 9, wherein the determination of validity comprises verifying that the credential is associated with the token manager.

13. The computer-readable medium according to claim 9, wherein the determination of validity comprises verifying that the credential is uniquely associated with the token manager and the computer server.

14. The computer-readable medium according to claim 9, wherein the authentication request message comprises a session token, and the determination of the validity comprises comparing the transmitted session token with a session token included in the credential.

15. The computer-readable medium according to claim 9, wherein the method further comprises determining from the transaction pointer whether the hardware token is currently registered for use in association with the token manager.

16. The computer-readable medium according to claim 9, determining, based on the correlating, whether the token manager has a connected status.

* * * * *

UNITED STATES PATENT AND TRADEMARK OFFICE
CERTIFICATE OF CORRECTION

PATENT NO.         : 9,860,245 B2
APPLICATION NO.    : 14/753177
DATED              : January 2, 2018
INVENTOR(S)        : Troy Jacob Ronda et al.

It is certified that error appears in the above-identified patent and that said Letters Patent is hereby corrected as shown below:

On the Title Page

Assignee:
"(73) Assignee: Secure Technologies Inc., Toronto (CA)"
Should read:
-- (73) Assignee: SecureKey Technologies Inc., Toronto (CA) --

Signed and Sealed this
Thirteenth Day of March, 2018

Andrei Iancu
*Director of the United States Patent and Trademark Office*